(12) United States Patent
Dumas

(10) Patent No.: US 7,346,597 B2
(45) Date of Patent: Mar. 18, 2008

(54) GEOSPATIAL MODEL FORECASTING OF EVENTS AND THREATS

(75) Inventor: Mark E. Dumas, Vienna, VA (US)

(73) Assignee: SPADAC Inc., McLean, VA (US)

( * ) Notice: Subject to any disclaimer, the term of this patent is extended or adjusted under 35 U.S.C. 154(b) by 471 days.

(21) Appl. No.: 11/098,510

(22) Filed: Apr. 4, 2005

(65) Prior Publication Data

US 2005/0222829 A1    Oct. 6, 2005

Related U.S. Application Data

(60) Provisional application No. 60/558,654, filed on Apr. 2, 2004.

(51) Int. Cl.
*G06F 17/00* (2006.01)
*G06N 7/00* (2006.01)
*G06N 7/08* (2006.01)

(52) U.S. Cl. .............................. 706/58; 706/45; 706/46
(58) Field of Classification Search .................. 706/58, 706/45, 46; 700/28
See application file for complete search history.

(56) References Cited

U.S. PATENT DOCUMENTS

| | | | | |
|---|---|---|---|---|
| 5,781,704 | A * | 7/1998 | Rossmo ...................... | 706/45 |
| 5,805,446 | A * | 9/1998 | Hatakeyama et al. ......... | 700/28 |
| 5,832,187 | A * | 11/1998 | Pedersen et al. .............. | 706/45 |
| 6,442,483 | B1 * | 8/2002 | Doglione .................... | 701/300 |
| 6,606,494 | B1 * | 8/2003 | Arpee et al. ............. | 455/422.1 |
| 2002/0035432 | A1 * | 3/2002 | Kubica et al. .................. | 702/5 |
| 2003/0083073 | A1 * | 5/2003 | Cossins et al. ............. | 455/446 |
| 2003/0115216 | A1 * | 6/2003 | Moore ..................... | 707/104.1 |
| 2003/0212494 | A1 * | 11/2003 | Alexander et al. ............. | 702/5 |
| 2004/0034666 | A1 * | 2/2004 | Chen ....................... | 707/104.1 |
| 2004/0044553 | A1 | 3/2004 | Lambert et al. | |

OTHER PUBLICATIONS

Avencia Incorporated, "Avencia Services", Mar. 31, 2004.
Massachusetts Institute of Technology, "Beyond The Vector Data Model-Part Two", 2003, http://ocw.mit.edu/NR/rdonlyres/Urban-Studies-and-Planning.
US Department of Justice, "N.I.J.'s Mapping & Analysis for Public Safety, Briefing Book", Mar. 1, 2004(updated), http://www.ojp.usdoj.gov/nij/maps/briefingbook.html.
Harris, Keith, PhD., "Chapter 4: Mapping Crime and Geographic Information Systems", Mapping Crime: Principle and Practice, http://www.ncjrs.org, pp. 91-126.

(Continued)

*Primary Examiner*—Joseph P Hirl
(74) *Attorney, Agent, or Firm*—Williams Mullen, P.C.; Thomas F. Bergert, Esq.

(57) ABSTRACT

A forecasting engine and method assists in rapidly and accurately forecasting occurrences of identifiable events and/or results based on signature and/or pattern matching. The present invention derives signature for event-types based on a comparison of actual event data with pre-established representational surfaces. The surfaces represent functional measurements and analysis associated with elements of the geospatial boundary being considered. The present invention provides highly refined modeling processes to assist in quickly focusing on the proper measurement type and/or variable type, and detailing analysis around the most relevant factors. In this way, the present invention allows for more rapid and more accurate assessment determinations. In one aspect, the present invention provides a decision support system for assisting in the determination of potentially successful commercial locations. In another embodiment, the present invention provides a centralized portal capable of assessing multiple problems simultaneously.

59 Claims, 26 Drawing Sheets

OTHER PUBLICATIONS

Gorr, Wilpen, "Cloudy, With a Chance of Theft", http://www.wired.com/wired/archive/11/09/view.html, Issue 11.09, Sep. 2003.

Singer, Emily, "Computer Model Forecasts Crime Sprees", Aug. 17, 2003.

Karuppannan, Jaishankar; Shanmugapriya, S., "Crime Analysis Mapping in India: A GIS Implementation in Chennai City".

Gorr, Wilpen; Olligschlaeger, Andreas, "Crime Hot Spot Forecasting:Modeling and Comparative Evaluation", May 6, 2002.

National Archive of Criminal Justice Data, "CrimeStat Spatial Statistics Program:Version 2.0", Mar. 31, 2004.

Switala, Kevin J., "Development of a Promising Residential Burglary-Forecasting Model".

National Law Enforcement and Corrections Technology Center, "From Description to Prediction: Crime Mapping", Summer 2001.

The Omega Group, "Identification of Urban Areas at High Risk for Criminal Activity Through Image Analysis: What are the possibilities?", Mar. 31, 2004.

Rose, S. Mariah, "Mapping Technology Takes a Bite Out of Crime", Business Geographics, Jun. 1998.

Gorr, Wilpen, "Proposed Crime Early Warning System Software", May 29, 2003 revised Jun. 5, 2003, http://morris.wharton.upenn.edu/forecast/crime/crimeearlywarningsystem.pdf.

Elder, Bethany, "Researchers Develop Crime Prevention Software", Carnegie Mellon News Periodical, Mar. 31, 2004.

Rayment, Murray R., "Spatial and Temporal Crime Analysis Techniques", Vancouver Police Department Technical Memorandum, Aug. 1995.

* cited by examiner

40

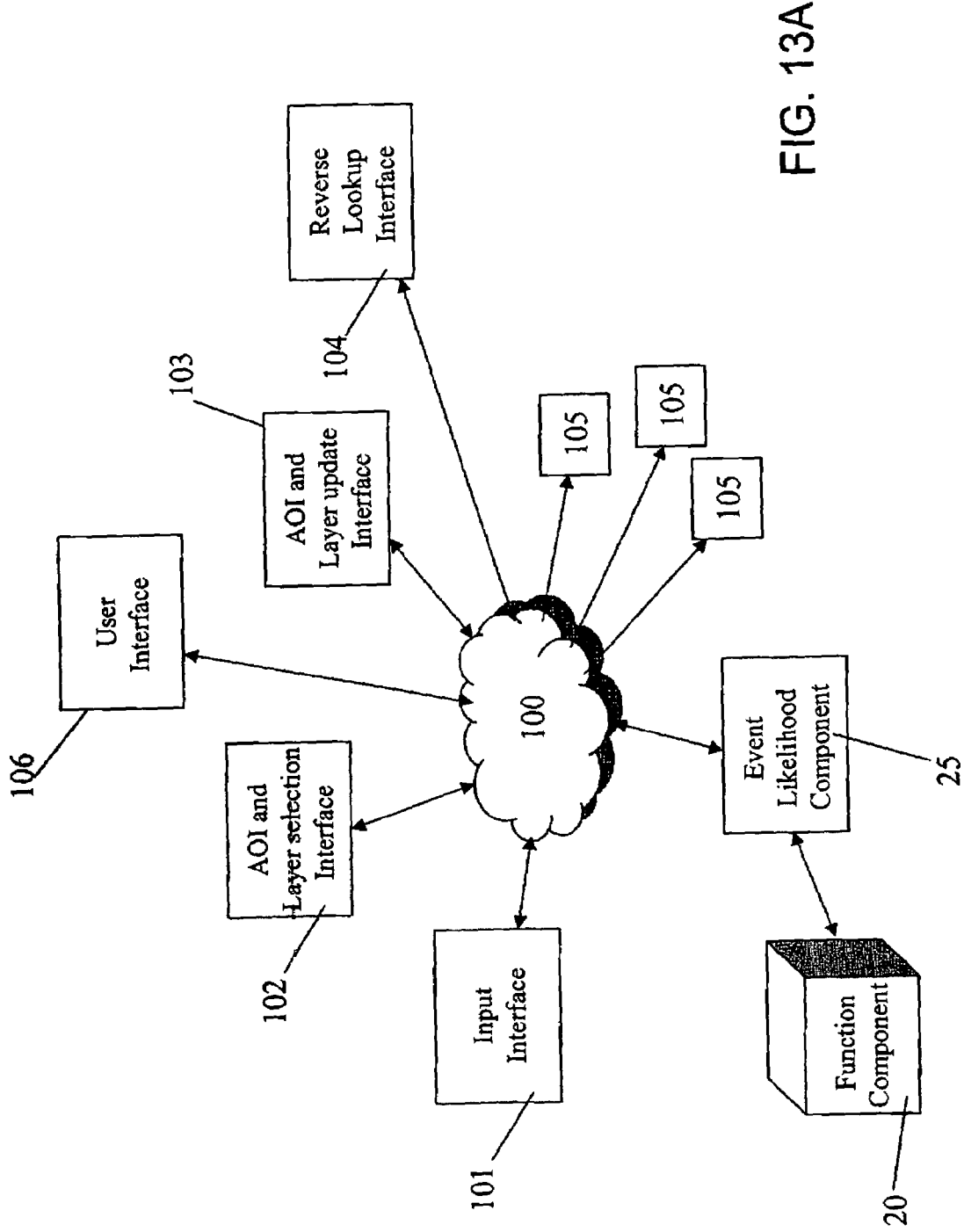

GEOSPATIAL MODEL FORECASTING OF EVENTS AND THREATS

REFERENCE TO RELATED APPLICATIONS

This application claims the benefit of U.S. provisional patent application Ser. No. 60/558,654, filed Apr. 2, 2004 and entitled "Method and System for Event and Result Prediction based on Geospatial Modeling", the disclosure of which is incorporated herein by reference.

FIELD OF THE INVENTION

The present invention relates to spatial modeling, and more particularly provides a system and method for forecasting events and results based on geospatial modeling.

BACKGROUND OF THE INVENTION

Geospatial modeling offers an approach to solutions to a variety of corporate, governmental and individual problems. For example, when a law enforcement or fire department agency seeks to analyze or react efficiently to crimes or fires, respectively, geospatial modeling might be used to locate the nearest water sources to quell the fire, or to locate the nearest police stations for personnel dispatch. As another example, when a retail chain seeks a location to open a new store, geospatial modeling might be used to determine most viable location based on available demographic information.

What is lacking and what is needed is a way to model information geospatially which will assist in forecasting events and/or results. No previous systems use geospatial modeling as disclosed by the present invention to assess where an arsonist might act next, for example, or where a retail establishment might be successful based on more than traditional demographic information. Typical of past systems is to predict a location of a future occurrence of a given incident-type by simply analyzing the location of the past similar incidents. Further, past systems are limited in that they do not simultaneously allow for rapid assessment determinations with increased accuracy. If increased accuracy is desired, these past systems require more computationally intense analysis which thereby requires more time. If speed of analysis is desired, accuracy suffers.

SUMMARY OF THE INVENTION

The present invention considers geographical features and multiple types of measurements connecting past incidents to those features as part of an overall system and method for rapidly and accurately assessing likelihoods of future events or results. The present invention can consider geospatial boundaries represented in irregular shapes as well as various functional measurements associating boundary cells and events with variables of interest and/or features of interest. The present invention further provides the capability to alert remote users within a geographical area of interest who are in communication with the system of the invention, in the event that an assessment reveals a forecast of relevant activity near a user's location. The present invention further allows for reverse-lookup of unknown event information to assess what the event-type might most likely be. Additionally, the present invention provides an influence element for analyzing most relevant variables and focusing the effort involved in determining assessments. The present invention further provides for adaptive resolution of images to assist in arriving at a rapid, yet accurate, assessment. The present invention further provides for rapid layer selection and replacement, for example, in the event a given layer of variables and/or features becomes outdated. In one embodiment, the present invention considers past data associated with several event-types in order to arrive at an assessment.

The present invention assists in forecasting occurrences of identifiable events and/or results based on signature and/or pattern matching. In one embodiment, the present invention identifies and indexes functional measurements for one or more "cells" within a boundary or geographical area of interest, derives a signature pattern for event types of interest, and then assesses links the derived signature to the stored cell information to assess the likely area for a future event of the same or similar event-type occurring. The present invention provides highly refined modeling processes to assist in quickly focusing on the proper measurement type and/or variable type, and detailing analysis around the most relevant factors. In this way, the present invention allows for more rapid and more accurate assessment determinations. The present invention, in one embodiment, provides a decision support system for assisting in the determination of a commercial location likely to be successful based on past results associated with similar commercial entities. The present invention, in another embodiment, provides a centralized portal capable of receiving geospatial data input as well as problem definitions which can be assessed based on stored geospatial data. Various user interfaces are provided in this embodiment for allowing a user to vary his or her level of involvement in selecting and inputting parameters for the analysis.

A method according to the present invention can include the steps of: storing geospatial boundary information for one or more areas of interest; storing geospatial characteristic information pertaining to at least one variable of interest in the form of one or more variable layers associated with said one or more areas of interest; establishing a geospatial boundary pertaining to a first area of interest and a grid containing a plurality of cells within said boundary; identifying a functional measurement of a cell element for each cell to said at least one variable of interest for each of said one or more layers associated with said first area of interest, and indexing said functional measurement for each cell; receiving geospatial information related to one or more past events of at least one event type, including location information for said one or more past events; identifying and indexing an event functional measurement from the location information for each of said one or more events to the at least one variable of interest for each of said layers, and deriving a signature pattern for said event type; and determining a level of signature match between said derived signature pattern and at least one cell of said plurality of cells, whereby a forecast of an event-type likelihood can be displayed on at least a portion of a display of said geospatial boundary based on said determined level of signature match.

BRIEF DESCRIPTION OF THE DRAWINGS

FIG. 13A is a schematic diagram showing additional components interacting with the event likelihood component according to various embodiments of the present invention.

FIGS. 13B through 18 show sample representations of a geographical boundary and elements employed in providing an assessment in accordance with one embodiment of the present invention.

DETAILED DESCRIPTION OF THE PREFERRED EMBODIMENTS

Figure 1:
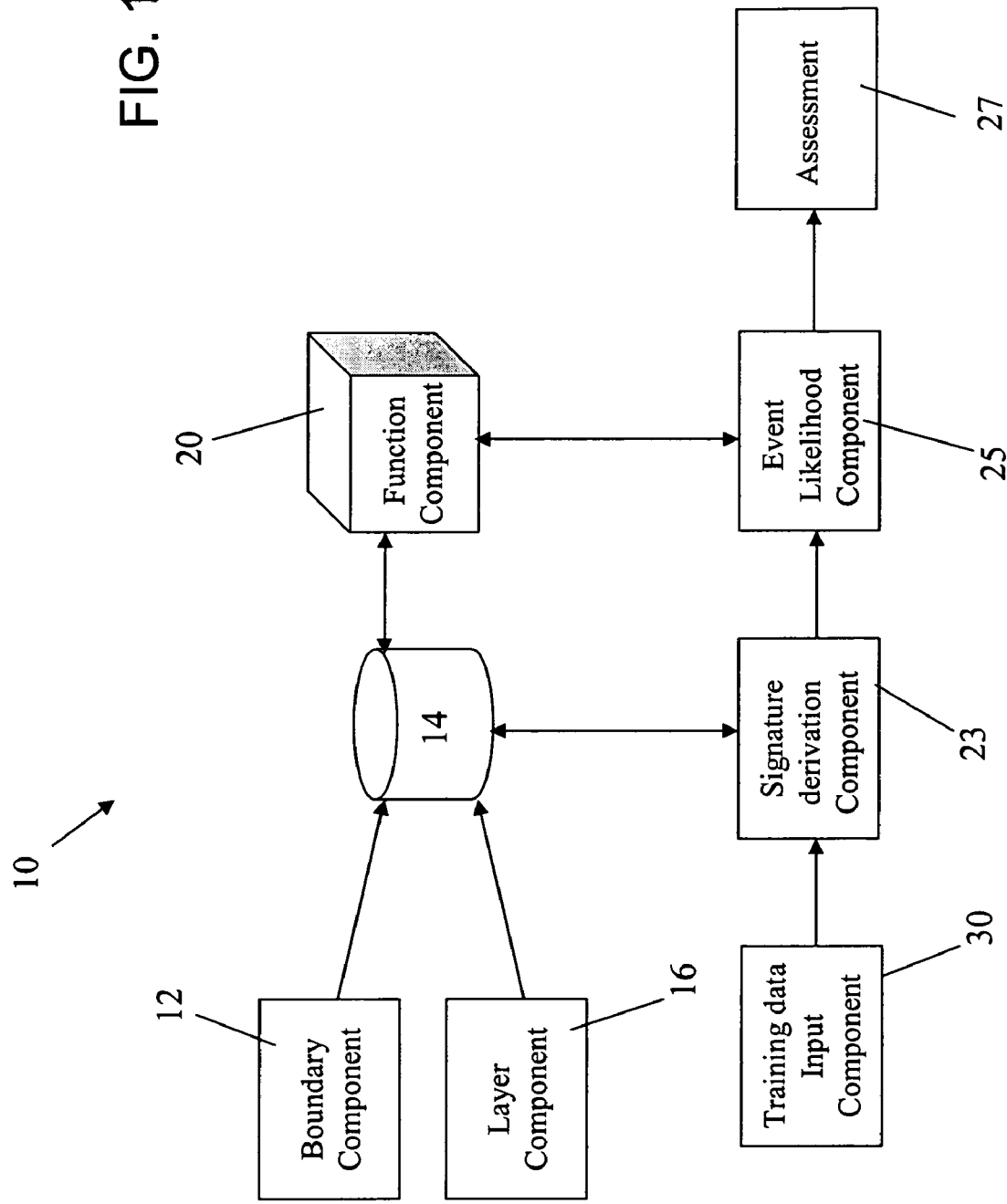
FIG. 1 shows a block diagram illustrating the interaction of several components of one embodiment of the present invention.
Figure 4:
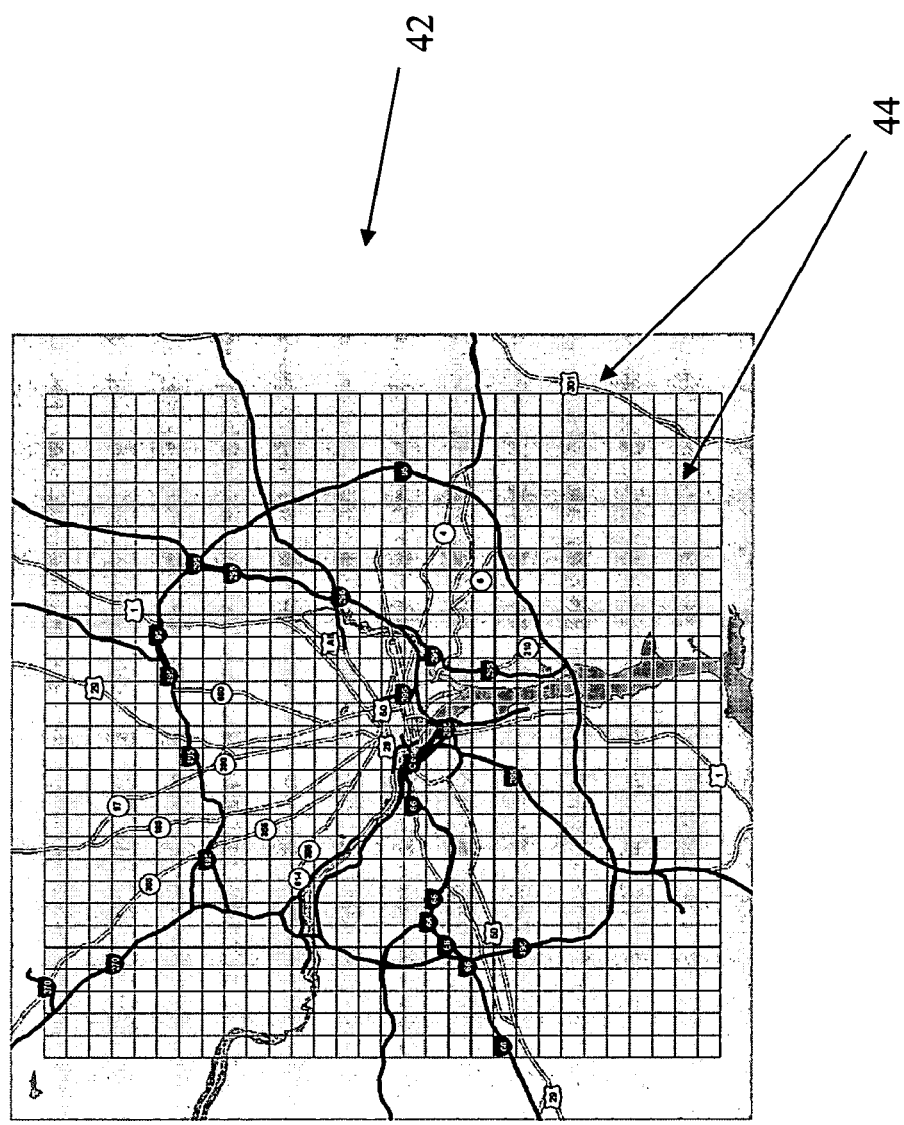
FIG. 4 shows the diagram of FIG. 3 with a grid overlay.
Figure 13B:
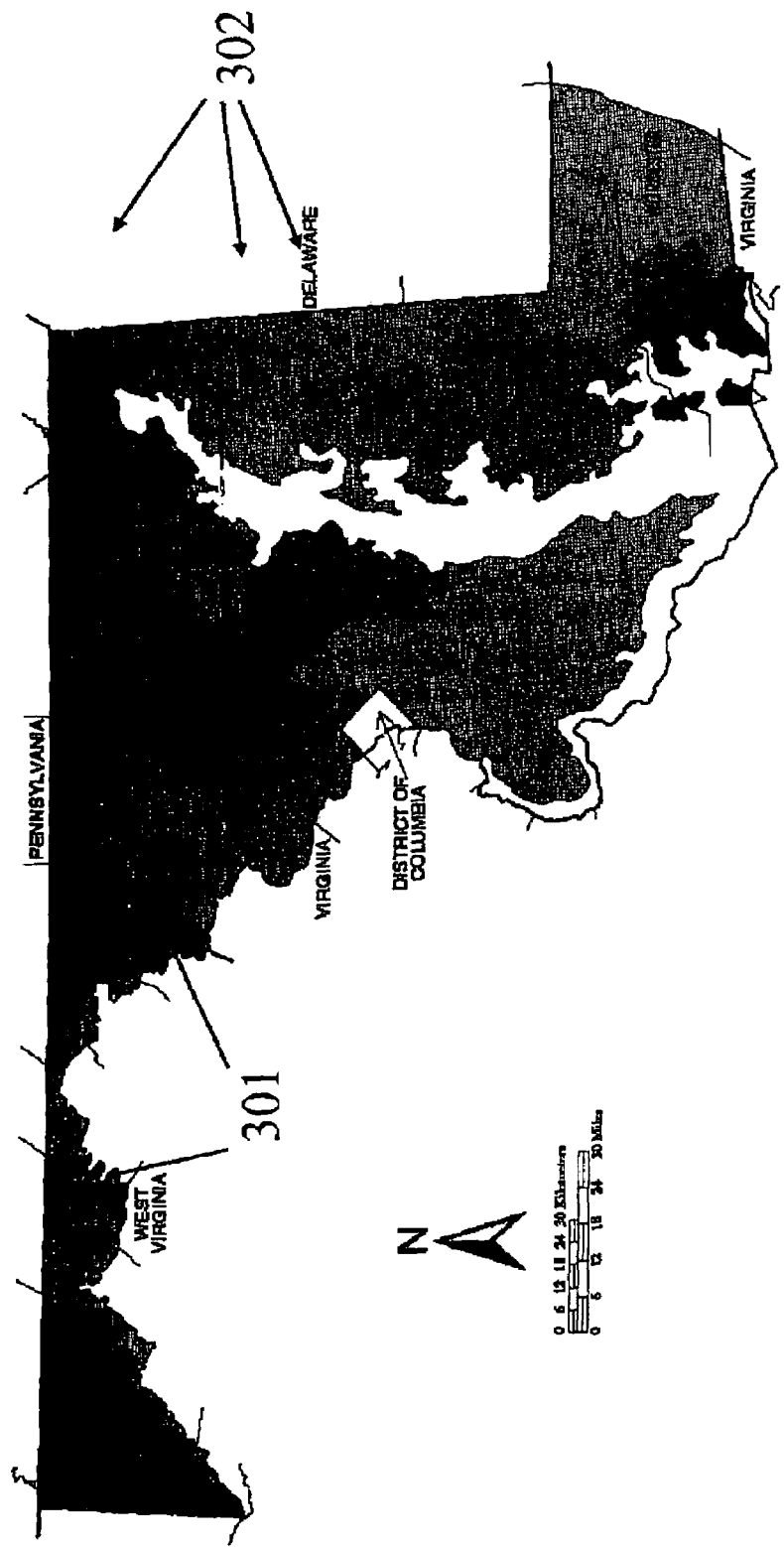

As shown in FIG. 1, the present invention provides a system 10 including a boundary component 12 which allows the system or a user to set forth or incorporate a geospatial boundary to be analyzed in accordance with the present invention. The boundary component also can specify individual cells within the boundary. Cells can be provided in a grid overlay such as shown in FIG. 4, with each cell being a regular and square-shaped element in a square- or rectangular-shaped grid. Alternatively, the cells can be provided in irregular shapes, such as shown in FIG. 13B, where as an example the cell boundaries are defined as the county boundaries in Maryland. Such irregular shapes can be dictated by political boundaries, natural boundaries, system- or user-created boundaries, or randomly. In one embodiment, boundary information and cell information can be stored in database 14 for one or more areas of interest.

The layer component 16 allows the system or a user to specify or incorporate one or more layers of geospatial features or characteristics pertaining to at least one variable of interest. For example, a "roads" layer may be provided having information pertaining to roads within the defined geospatial boundary. The roads layer may also be provided with additional variables of interest associated with roads, such as the number of lanes in a given road, whether the road is a highway or a city street, or whether the road is one-way or two-way, for example. Example types of layers can include: roads, cities, towns, cemeteries, embassies, gardens, industrial facilities, junctions, educational facilities, bodies of water, settlements, national parks, city or county facilities, bridges, hotels, fuel stations, hospitals, airports, train stations, parking lots, campsites, rest areas, archeological sites, and churches/holy places. Other layers can include information such as demographic information such as age, gender, income, and/or religion type, for example. It will be appreciated that the present invention can incorporate both static (e.g., bridges) and non-static (e.g., road construction locations, police speed traps, etc.) variables. Layer and variable data are stored in spatial database 14. While boundary component 12 and layer component 16 are both shown in FIG. 1 as providing information to the same database 14, it will be appreciated that database 14 can be divided as necessary into multiple databases in order to accommodate the most suitable database architecture for a given system application.

A function component 20 provides programming for identifying and measuring a functional measurement associated with an element or elements of each cell. For each cell, the function component can help determine a cell element from which measurements can be taken, as necessary. As shown in the regular cell example of FIG. 5, each square-shaped cell 44 has a middle point 54 derived from the known center of a square (i.e., the intersection of a vertical line drawn at the width halfway point with a horizontal line drawn at the length halfway point). As shown in the irregular cell example of FIG. 13B, each irregular cell can have a single cell element located at the center of mass or centroid of the cell (see points 302). Alternatively, the irregular-shaped cells can have multiple elements which assist in deriving more accurate values as described hereafter (see points 301). These multiple elements may be system-generated automatically, and may also be generated by the user or through some semi-automated process. It will be appreciated that high intra-cell measurement variability leads to imprecise representation of the underlying statistical surface as a choropleth when a single cell element is used for measurement. Using multiple elements in each cell produces a more accurate representation of the statistical surface, and in the limit this leads to a dasymetric map with perfect representation of the surface.

Figure 5:
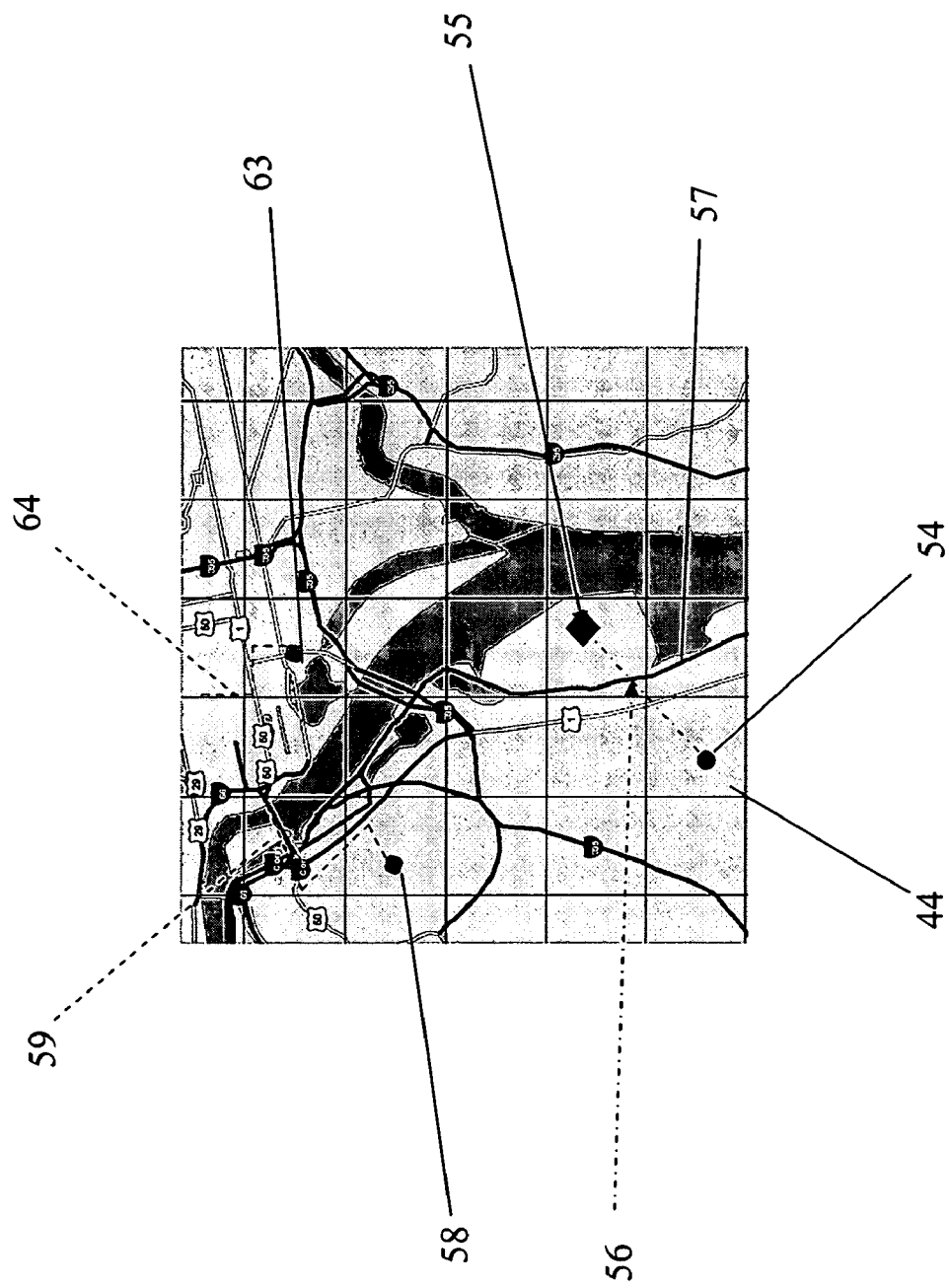
FIG. 5 shows a close-up segment of the diagram of FIG. 4 as an illustration of determining cell measurements in accordance with one embodiment of the present invention.

The function component can determine a measurement for each cell from the cell element (e.g., midpoint, centroid, etc.) to the variable of interest. In one embodiment, this measurement is the nearest neighbor distance. For example, as shown in FIG. 5, cell element is midpoint 54, the variable of interest can be airport 55, and the measured nearest neighbor value is distance 56. In another embodiment, this measurement is the nearest neighbor value. For example, as shown in FIG. 5, cell element is midpoint 54, the variable of interest is the number of lanes on the nearest road 57, and the nearest neighbor value is two (assuming road 57 has two lanes). In another embodiment, this measurement can be the density or concentration of a particular item. In still a further embodiment, this measurement is the average distance by actual path. For example, as shown in FIG. 5, actual path 59 can take into account the distance using actual roads from the cell element 58 to the variable of interest (e.g., a bridge crossing). In one embodiment, actual path can be considered based on artificial paths (e.g., man-made roads) as well as based on natural paths (e.g., a river or a clearing). In a further embodiment, the determined measurement is the Manhattan distance. For example, as shown in FIG. 5, cell element 63 can trace a Manhattan distance path 64 to variable of interest, and the distance along path 64 can be determined.

In a further embodiment the determined measurement is based on visibility. In this regard, the present invention employs a GIS function called a "viewshed", which gives the area visible along line of sight paths from a single point on the ground. The way the invention uses this is by including a 'has line of sight' calculation from an event to a feature. For example, if the events are animal poaching in a national park, each event could have a variable calculation on whether it is visible from a ranger tower in the park. This can be generalized to including the number of towers which are visible from each poaching event.

In another embodiment, the determined measurement is based on any type of function call to another computational function (e.g., a function derived programmatically by a third party), such that the results can be returned to the system for use in determining a signature. Thus, the invention is not limited to a probability density function or data sets that comprise a probability density function.

In yet a further example, the measurement is manually created, wherein a user establishes a signature using information not derived from the invention. For example, the invention can allow the user to input via a user interface a generalized density function manually. In an illustrative embodiment, this function can take the form of a histogram, a continuous function of distance, or any values the user may require. The system will then validate and make scaling changes as necessary to ensure the probability density function is valid. For example, if the user knows that of the store locations he/she owns, 20% are two story, 30% are three story, and 50% are one story dwelling, a probability density function for number of floors in a store that looks like Function A below:

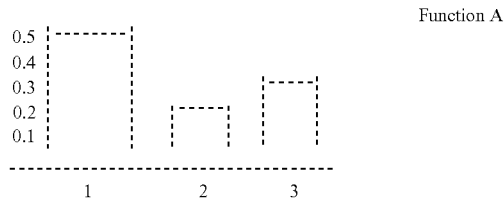

Function A

This function can be drawn on a GUI tool, entered into a table, or described with a function, for example.

Once all measurements are determined and calculations performed, the function component stores all measurements and calculations for later use when examining signature information associated with actual training data.

In one embodiment, layer component 16 includes an update layer element which operates to update the spatial database 14 upon receiving changes to existing layers or entirely new layers. The update layer element can trigger the layer component 16 to notify the function component 20 upon receipt of the updated or new layer, at which point the function component can either complete whatever current processing is occurring, or the function component can delay any further processing until the updated or new layer is incorporated. To the extent the new or updated layer is part of the currently processing assessment, the function component can re-initiate this segment of the analysis.

An event likelihood component (ELC) 25 performs analyses based on signatures constructed from available actual data received, for example, from an input component 30, to determine likelihood of similar events occurring in the geospatial boundary. The event data can be, for example, locations where previous armed robberies occurred. A signature derivation component 23 receives the data, and measures and analyzes it against one or more of the layers entered in database for a given geospatial boundary. The signature derivation component 23 then constructs a raw signature, reduces the information into a histogram or probability density function (see FIG. 7), and establishes a signature for this event type (e.g., armed robberies) within the geospatial boundary. The ELC 25 receives the derived signature from the signature derivation component 23, then combines the signature with the functional measurements stored by the function component regarding each cell, and thereby measure a level of signature match with one or more cells for the given event type. The level of signature match is an assessment 27 which can be determined by calculating a score associated with each cell. The scores can be plotted on a choropleth graph as shown in FIGS. 8 through 11, which can give a viewer a "hot spot" type reading, for example.

It will be appreciated that components 12, 16, 20, 23, 25 and 30 can be interconnected in a variety of configurations, such as by local area network, or wide area network such as the Internet, for example. Each component may comprise an individual server having a processor, memory and storage, or may comprise a programming element of multiple programs stored and executed on a single server, for example, as is known in the art. In one embodiment, various computationally intense aspects of the invention are distributed among multiple processors to promote efficiency and speed of the present invention.

Figure 2:
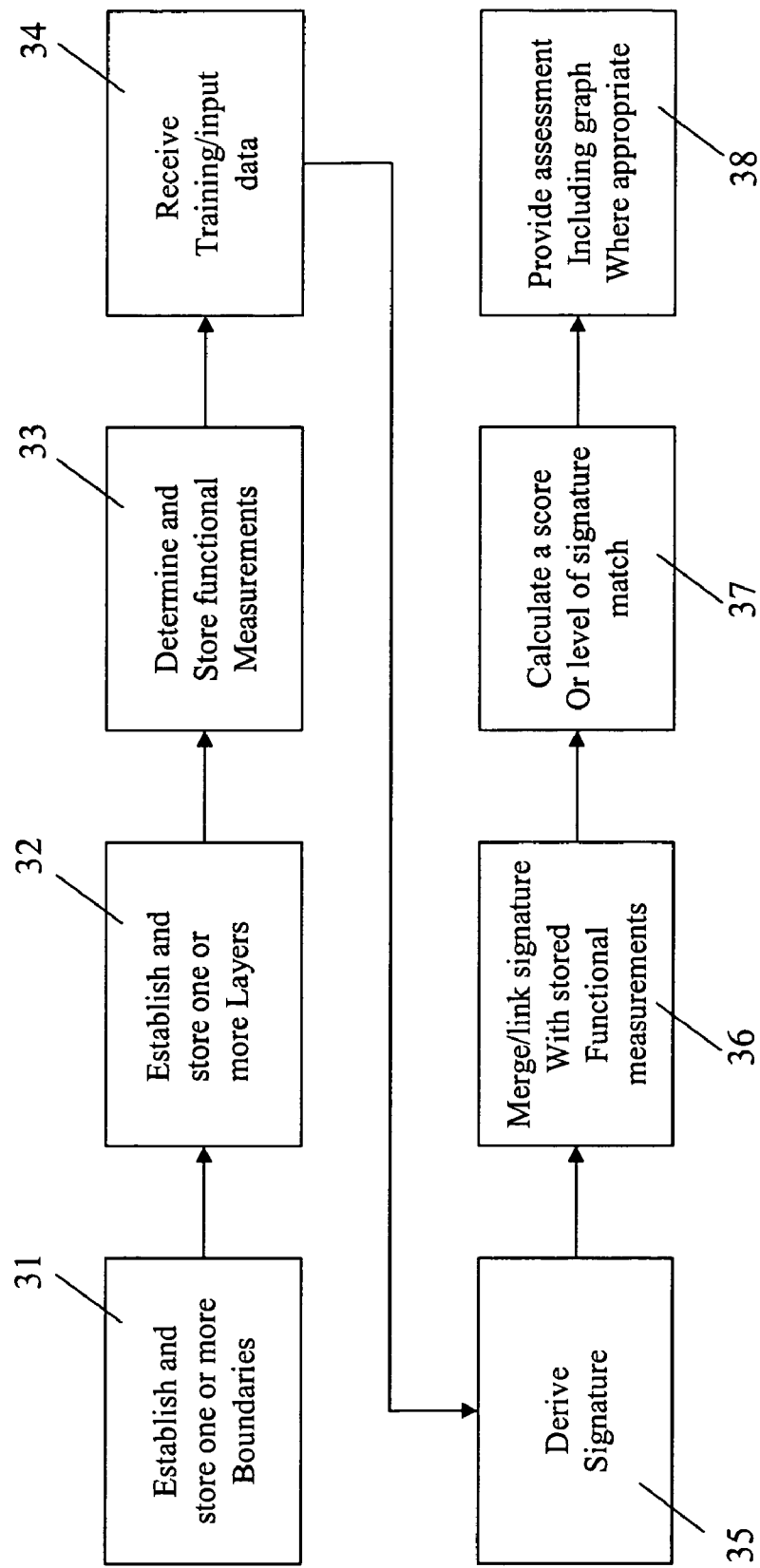
FIG. 2 is a block flow diagram illustrating steps taken in accordance with a forecasting method of one embodiment of the present invention.
Figure 3:
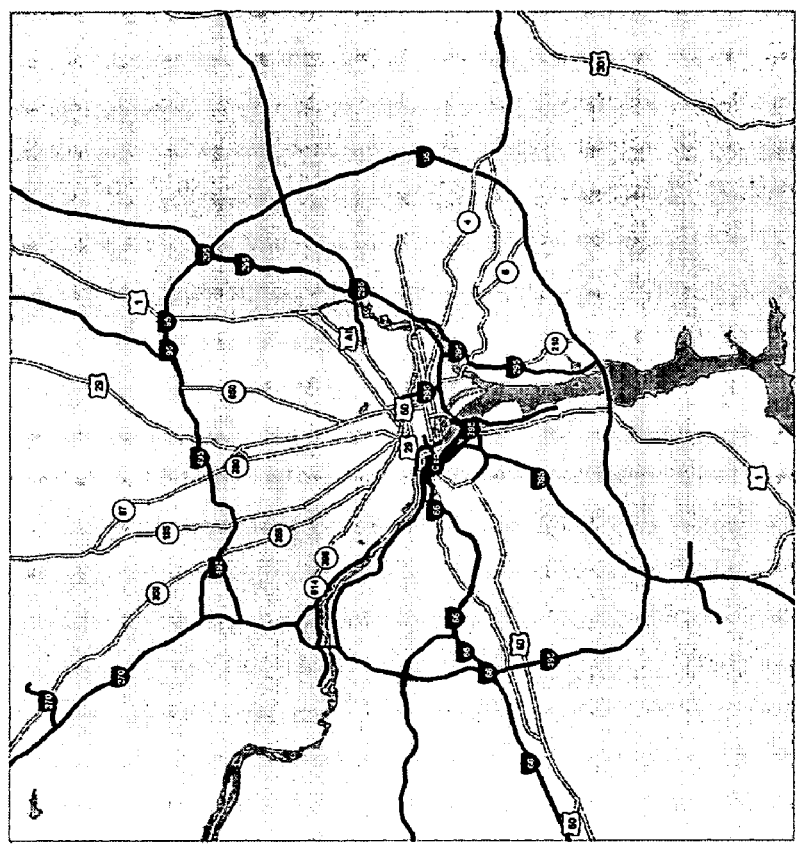
FIG. 3 is a sample diagram of an area of geographical interest in accordance with an illustrative embodiment of the present invention.

A method for employing the system of the present invention to arrive at a forecast or an assessment of a future event likelihood can occur as shown in FIG. 2, and a graphical representation of some of the steps described can appear as shown in FIGS. 3 through 11. As shown at 31 in FIG. 2, and 40 in FIG. 3, a geospatial boundary can be defined, such as a 20 mile by 20 mile square area around Washington, D.C. Within this boundary, a grid 42 of smaller geographical areas (i.e., cells 44) can be created within the boundary, as shown in FIG. 4. As shown within the boundary, one or more layers having "variables of interest" (e.g., schools, roads, rivers, 7-Elevens, etc.) can be established. These layers can be thematic data sources and the establishment and input of one or more of these layers corresponds to step 32 in FIG. 2. In the particular example of FIG. 5, an airport (Reagan National Airport) is shown as at 55, along with some rivers 53 and roads 57.

Next, proximity or functional measurements are derived and stored for each cell and for each variable of interest, as indicated at step 33. For example, as part of the method of the present invention, for each cell 44, a proximity measure can be determined for each of the different variables of interest. Using cell 44 in FIG. 5 as an example, there is a straight line proximity measure (proximity SL) 56 between the midpoint or training point 55 of cell 44 and the airport 55. A proximity (or nearest neighbor) SL measurement can be stored for each cell against each variable of interest. It will be appreciated that the present invention contemplates straight line proximity measurements as well as alternative proximity measurements, such as proximity by road traversal, proximity by time of travel, proximity by time of travel using motorized vehicle, by an adult or child walking, by an adult or child running, and so forth.

The invention further contemplates functional measurements such as described above to accommodate non-proximity or non-nearest neighbor evaluations. Other factors which can be considered in addition to proximity include natural measures, such as temperature, elevation, wind speed, precipitation, tidal information, pressure, humidity, luminance or slope, for example. Still other factors can include feature density, or demographics such as ethnic populations and population density. These types of factors can be considered "continuous" factors, to be described more completely elsewhere herein.

As opposed to continuous factors, the present invention can also consider "discrete" factors or variables, such as certain demographics like predominant religion or predominant ethnic group, for example. Other discrete factors the present invention can consider include land utilization, zoning and/or predominant vegetation.

Figure 6:
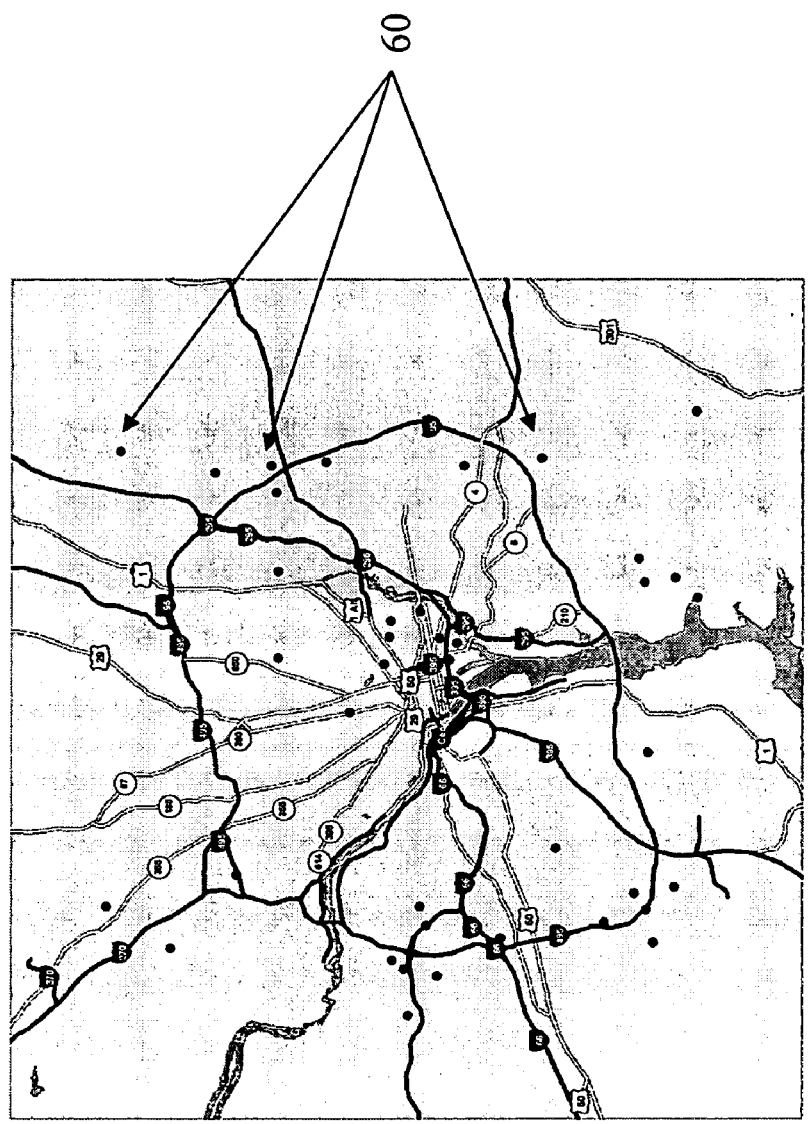
FIG. 6 shows the sample diagram of FIG. 3 with points illustrating past event data in accordance with an illustrative example of employing the present invention as described in the specification.

Once each cell has been measured according to the appropriate factor for the problem to be solved or event to be forecasted, the present invention can receive information pertaining to a location of a meaningful event or events (e.g., a robbery), as indicated at 34 in FIG. 2. The location information can be specified by block and street (e.g., 4400 block of Hill St.), by latitude and longitude, or other known format. As shown in FIG. 6, events can be designated by black dots 60.

Next, the invention can identify the proximity of the event to the variables of interest (e.g., the robbery occurred 0.2 miles from a 7-Eleven, 0.5 miles from a highway, and 2 miles from a river). Based on the identified location, proximity to variables of interest can be determined, much like was done for each cell.

Next, the invention can establish a "raw signature" for the event. For example, if five events (robberies) occur and there are two variables (highway, river), the raw signature might look like that in Table 1 below:

TABLE 1

| Event # | Variable #   | Calculation | Special/Feature ID |
|---------|--------------|-------------|--------------------|
| 1       | 1 (highway)  | 0.2 km      | 55                 |
| 2       | 1            | 0.1 km      | 55                 |
| 3       | 1            | 1 km        | 443                |
| 4       | 1            | 0.7 km      | 618                |
| 5       | 1            | 0.15 km     | 99                 |
| 1       | 2 (river)    | 4 km        | 12                 |
| 2       | 2            | 2 km        | 12                 |
| 3       | 2            | 7 km        | 12                 |
| 4       | 2            | 1.2 km      | 12                 |
| 5       | 2            | 5 km        | 12                 |

It will be appreciated that the special/feature ID shown in column 4 can be an identifier for the highway (e.g., 55 can be Rte 95, 443 can be Rte. 66, etc.) or other variable.

Figure 7:
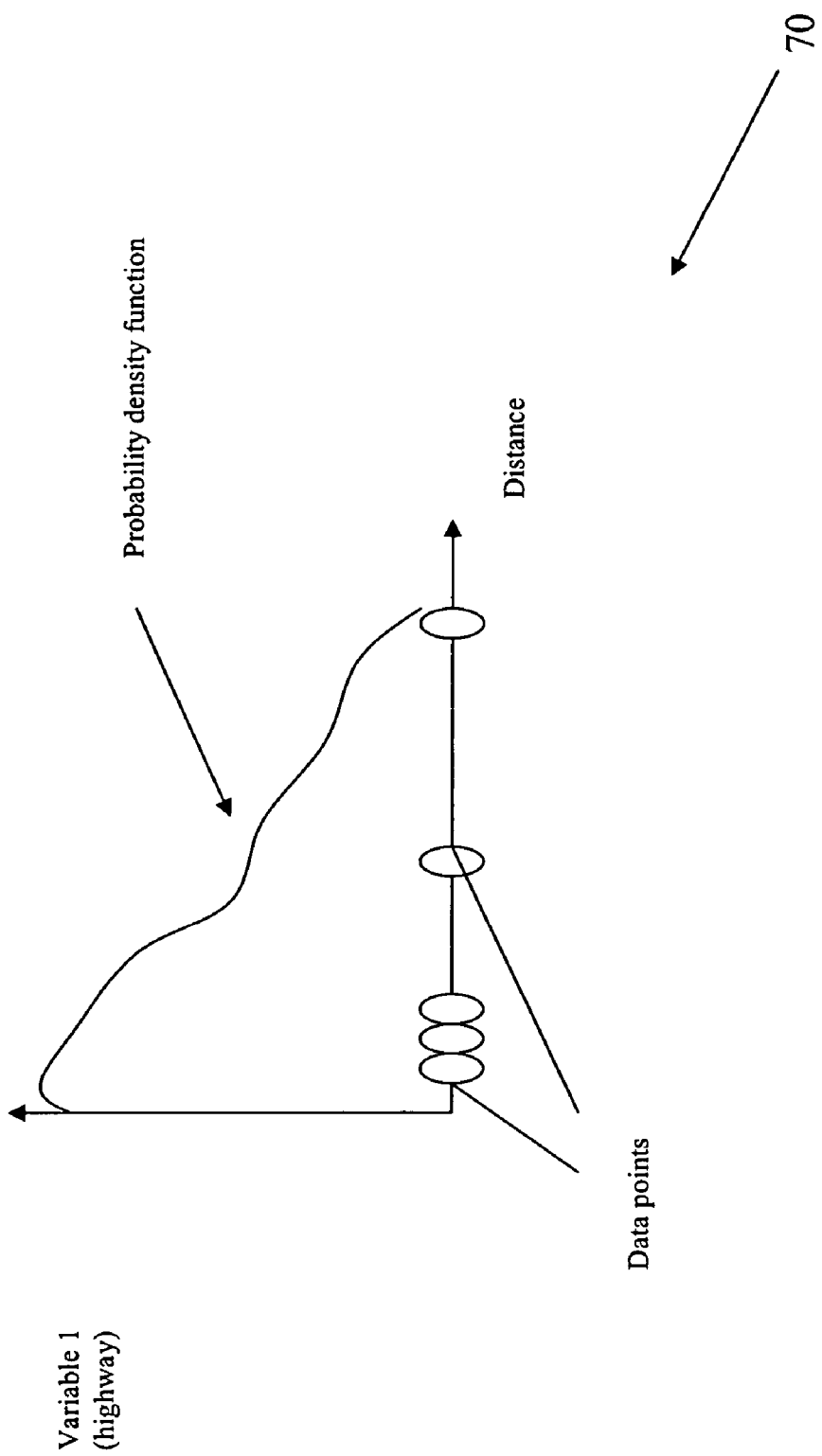
FIG. 7 is an example probability density function in accordance with an illustrative example of employing the present invention as described in the specification.
Figure 8:
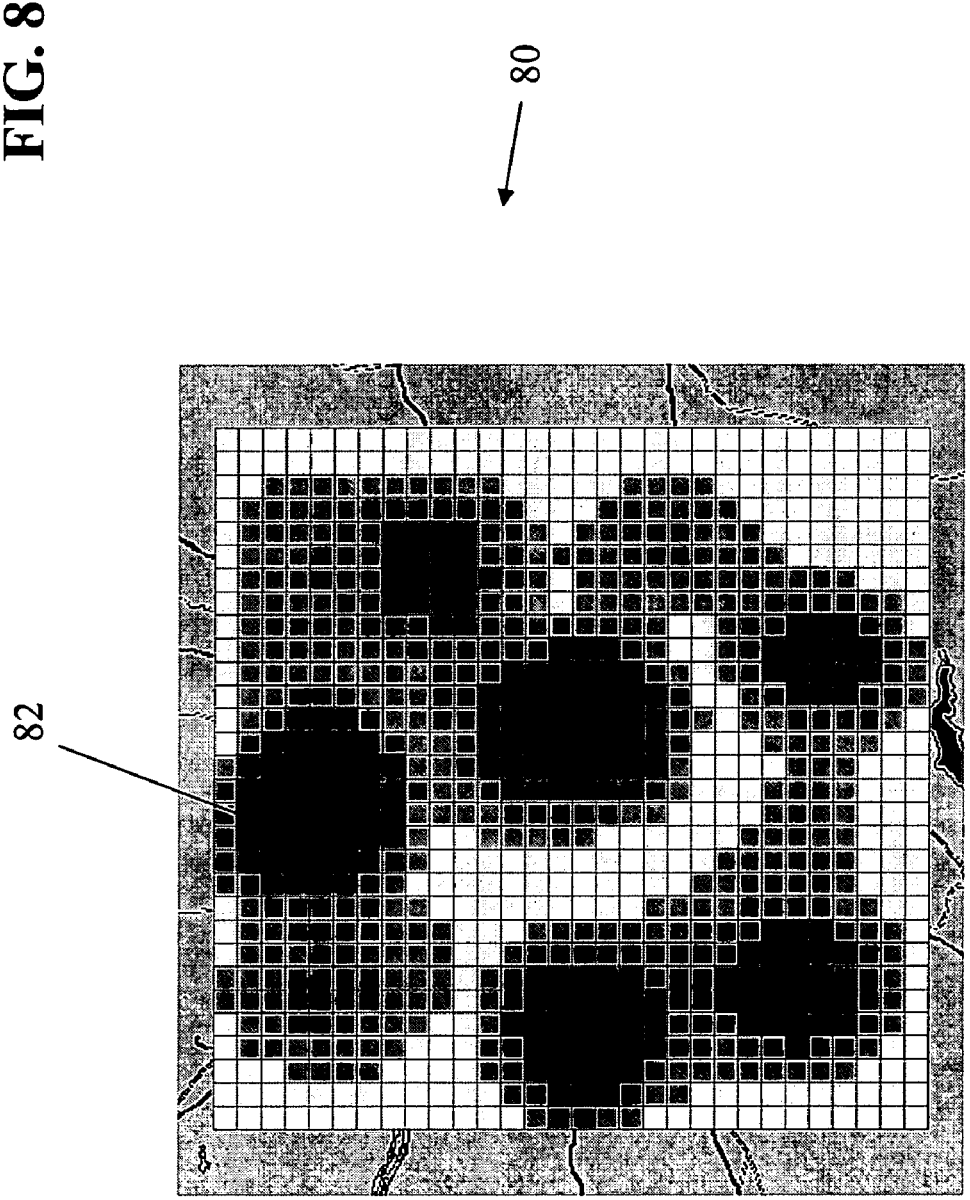
FIGS. 8 through 11 are example diagrams showing graphical "hot spot" representations according to various embodiments of the present invention.

Next, the invention can measure a probability density function for each variable, so as to have a probability associating the events with a variable of interest, as shown by the example graphical representation 70 in FIG. 7. In this example, the five data points from item 7 represent the distance of the five robbery events from a highway. In three cases, the robbery was very close to a highway. One case was somewhat close, and another case was more distant from the highway. The probability density function is performed for all events against each variable individually. While the representation in FIG. 7 is a continuous probability density function, it will be appreciated that histogram-type probability density functions can be provided in connection with discrete variables, such as those identified above (e.g., predominant religion or ethnic group demographics, land utilization, zoning, predominant vegetation, etc.).

Once this is done, a refined signature based on the probability density function can be established. In one embodiment of the invention, the probability density functions can be converted into a binary file, which can then be used in each of the cells outlined above. The processing of the event data from input to a signature is illustrated at step 35 in FIG. 2, for example. At step 36, the event signature is compared with the cell signatures previously determined and stored at step 33.

Next, for each of the cells, a score indicative of that cell's compatibility with the refined signature can be determined, as at 37 in FIG. 2. Each cell will have a probability score associated with each variable. In one case, the total score can be the sum of each of the probability scores. In other cases, coefficients can be provided to assign weights to different variables as described hereafter.

Figure 9:
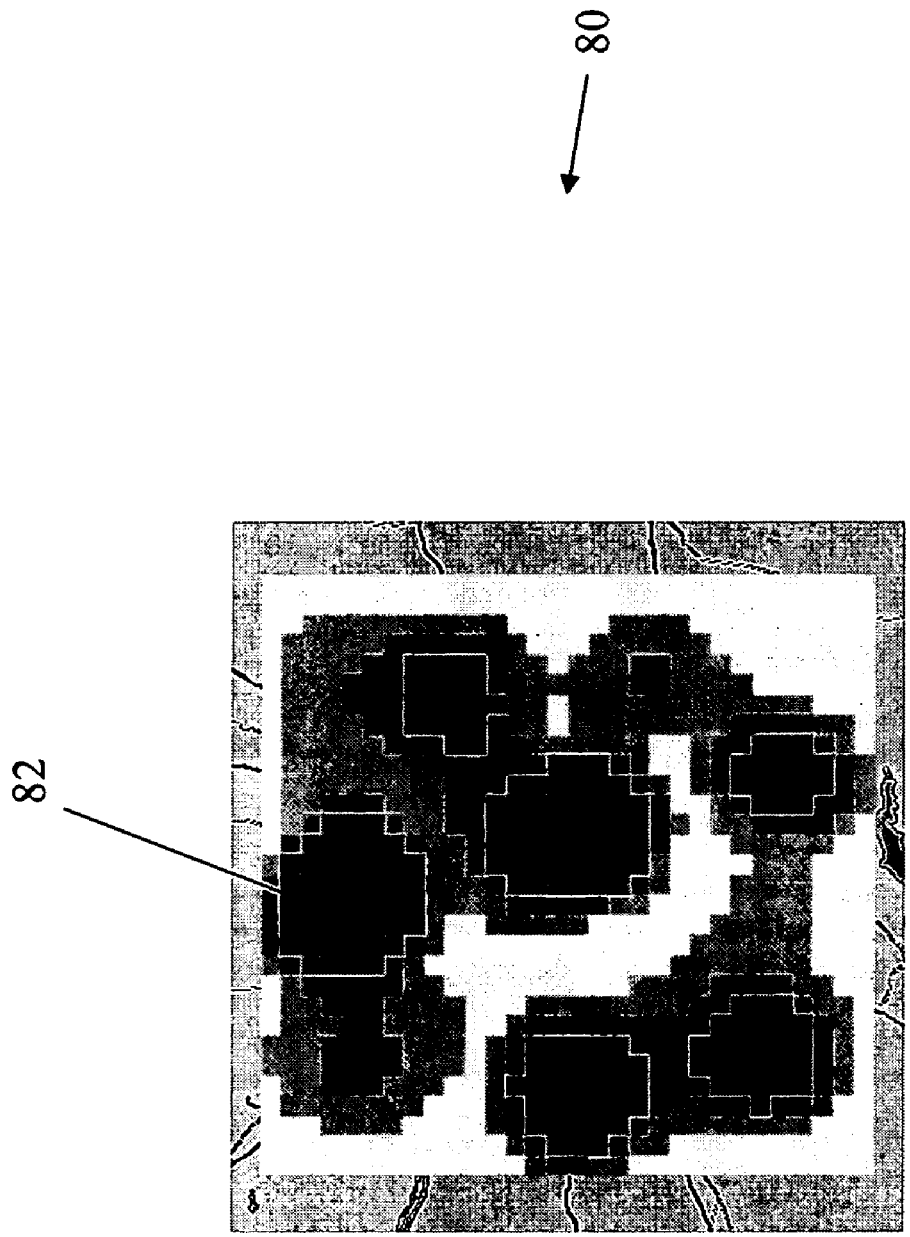
Figure 10:
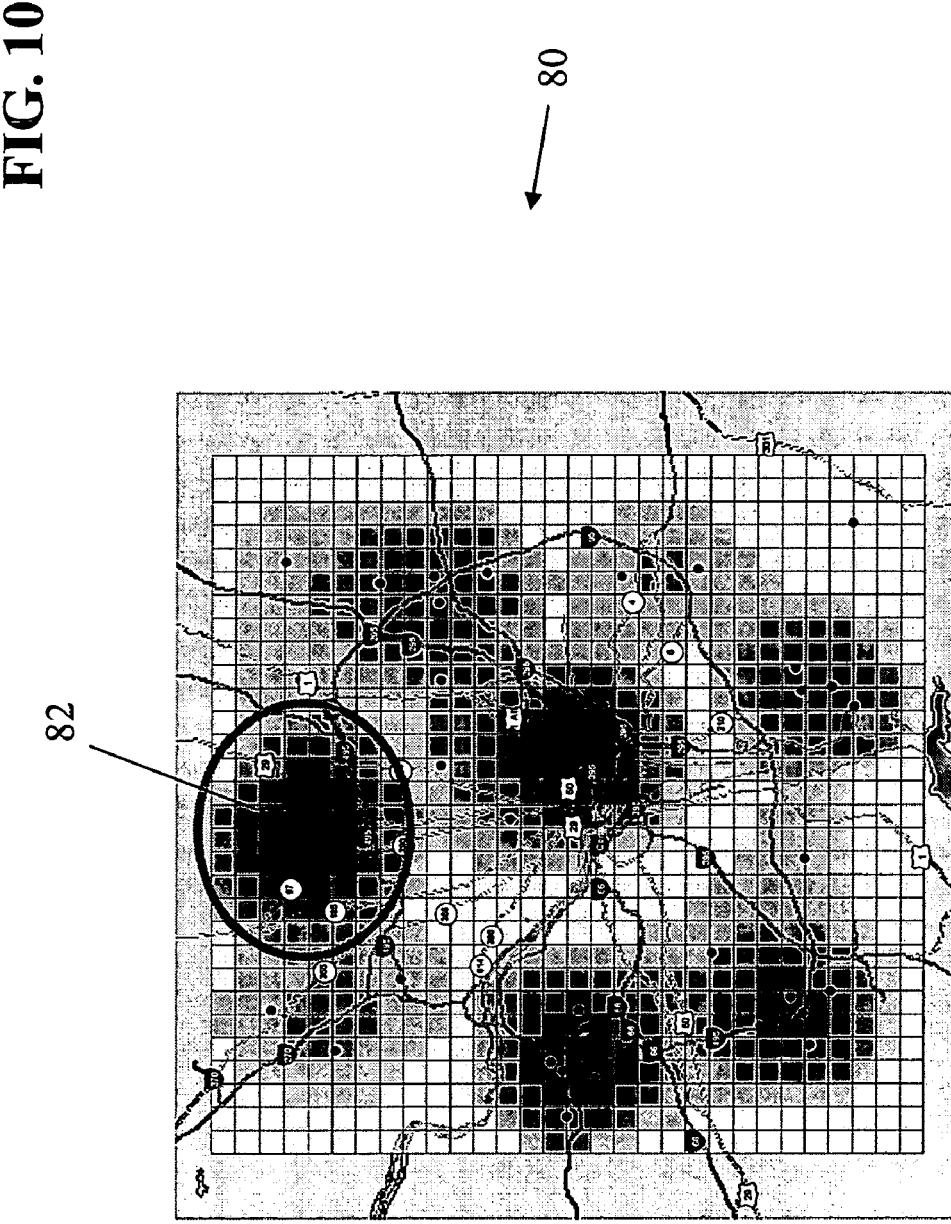
Figure 11:
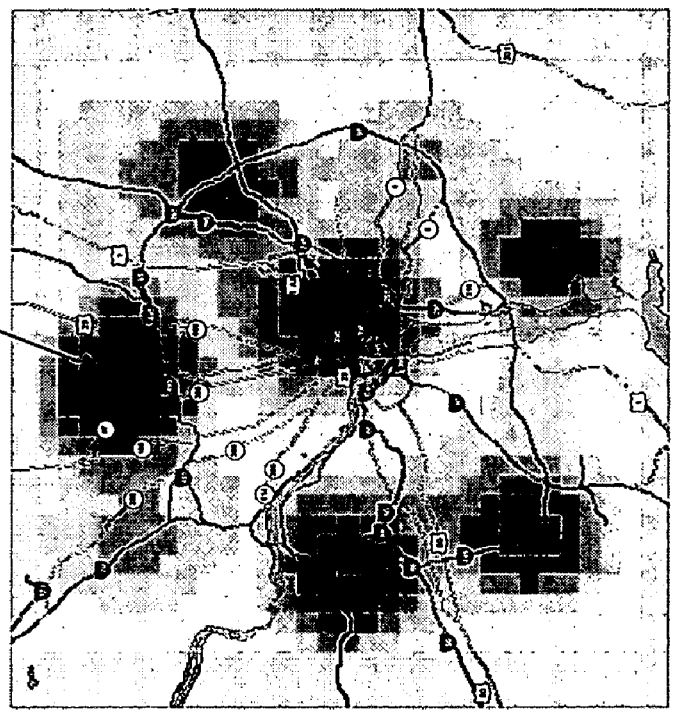

Once the cells have been given a score, the entire boundary 80 can be viewed at a distance to determine geospatial "hot spots" 82, as shown in FIGS. 8 through 11, and indicated at step 38 in FIG. 2. For instance, instead of limiting analysis to particular cells, the entire region can be analyzed for groups of cells that appear to have high probabilities of an event occurring. FIGS. 9 and 11 show the grid 80 without original cell lines, and FIG. 10 shows the cells slightly faded to reveal roads underneath.

In this way, the present invention helps evaluate where a future similar event might occur. Quite often, hotspots are revealed where no prior event has occurred. The system and method of the present invention can thus reveal that the environment in this hotspot is similar to the environment where prior events or results had occurred.

Figure 12:
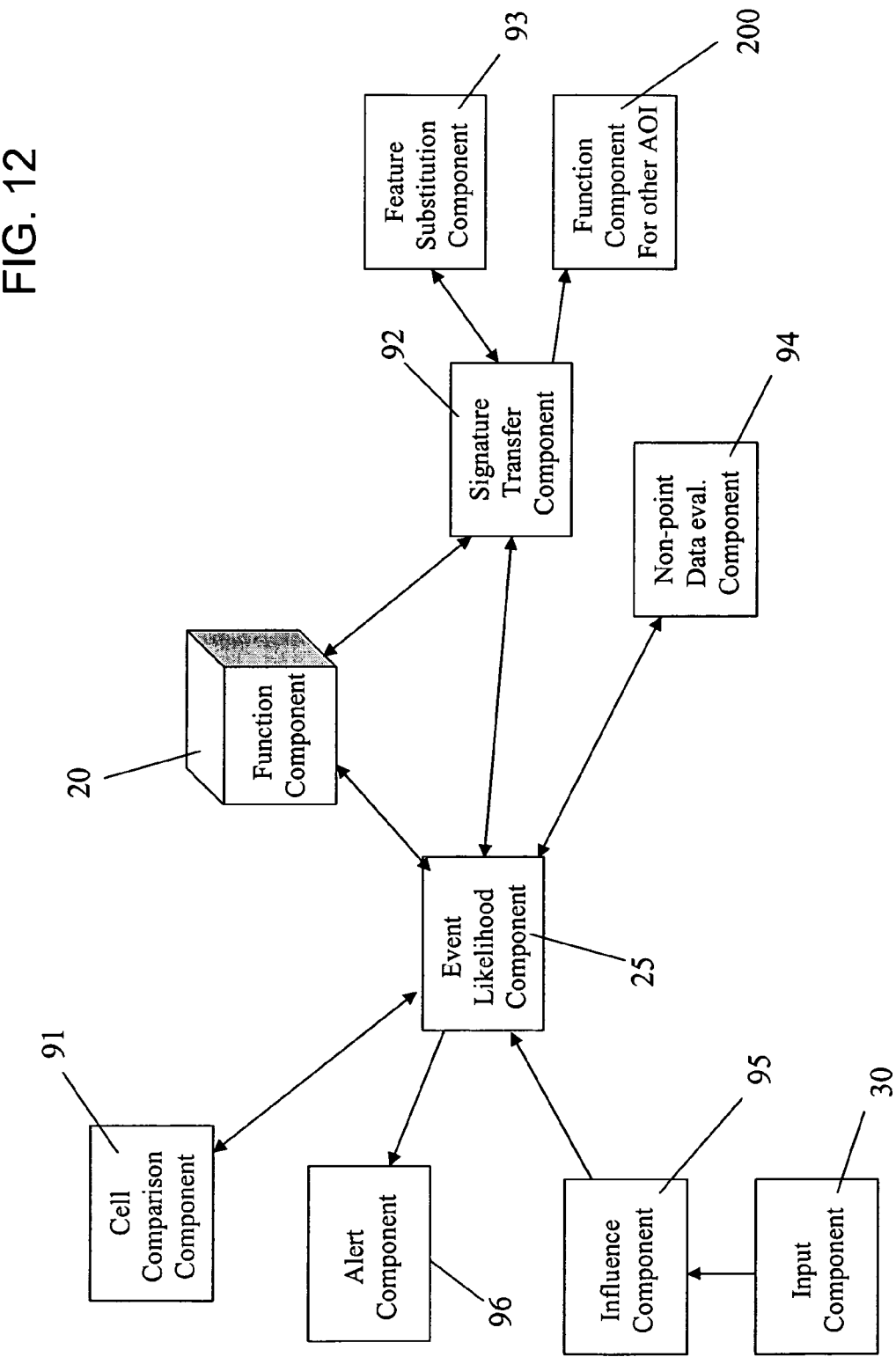
FIG. 12 is a schematic diagram showing an arrangement of components according to an alternative embodiment of the present invention.

As shown in FIG. 12, in one embodiment of the invention, the event likelihood component 25 interacts with additional components to assist in rapidly and efficiently reaching the most optimal assessment. For example, a cell comparison component 91 determines, for each past event in the training data, the individual cell element nearest to that event, and then associates the functional measurement for the nearest individual cell element with the data event. In doing so, the present invention need not determine a functional measurement for the event when it can be looked up by cell index, thereby improving the speed of the signature derivation. The cell comparison component 91 can then provide this information to the event likelihood component 25, which determines the level of signature match as described above.

As further shown in FIG. 12, the event likelihood component 25 can interact with a signature transfer component 92, which allows the system or a user to take event signatures (e.g., armed robbery signature) and apply it to a different area of interest as held or entered into the boundary component database 14. In this way, the invention contemplates that events which occur in a separate geographic region (e.g., bank robberies in Richmond, Va.) can be used to determine or predict similar events in another region. The signature transfer component can operate by taking the signatures and/or associated collections of probability functions for given event types in a first region, and applying them within the second region. This can occur via functional component 20 which accesses a separate set of data from boundary component database 14, or via a separate functional component 200 which has been pre-established for the second region.

As part of signature transfer component 92, the present invention contemplates that there may be variables of interest associated with a first region which have no direct equivalent in the second region. For example, "sidewalks" may be a variable of interest in the first region, but if there are no sidewalks in the second region, this variable could not ordinarily be taken into consideration in determining an event signature. In such cases, the present invention provides the signature transfer component with a feature substitution or variable equivalence component 93, which determines the next most likely substitute for the intended variable. For example, if there are no sidewalks in region 2, the feature substitution component may employ residential, secondary or tertiary roads as a substitute, given that such roads typically run parallel to sidewalks.

Further in connection with event likelihood component 25, a non-point data evaluation component 94 can be provided for situations where the past event training data is not conducive to representation in point format. For example, a location where an armed robbery occurs can be a point, such as the location of the bank where the robbery occurred. However, if the event type is broadened to encompass, for example, a radius of where an alleged perpetrator may have fled to within two minutes of the robbery, the past event data would not be represented as a point, but rather an area. The present invention can accommodate such past event data via the non-point data evaluation component 94. As such, this component 94 considers variations of non-point data such as, for example, polygons, lines, and three-dimensional data.

As further shown in FIG. 12, an influence component 95 can also be provided which assigns variable weights to variables of interest. In one embodiment of the present invention, the influence component 95 determines relative weights to associate with each of the variables of interest based on comparing the established signature for each variable of interest with a control signature. The control signature can be, for example, a random sample of data. In doing so, the present invention can detect the amount of overlap between the two signatures as a measure of the power of the given variable of interest in distinguishing the event locations from random locations.

The influence component can consider differences in variance between each of the established signatures and the control signature in determining relative weights. Further, the influence component can consider differences in mean between each of the established signatures and the control signature. It will be appreciated that while the present invention can distinguish between differences in variance as well as mean, a simple t-test or similar test does not do this.

Figure 19:
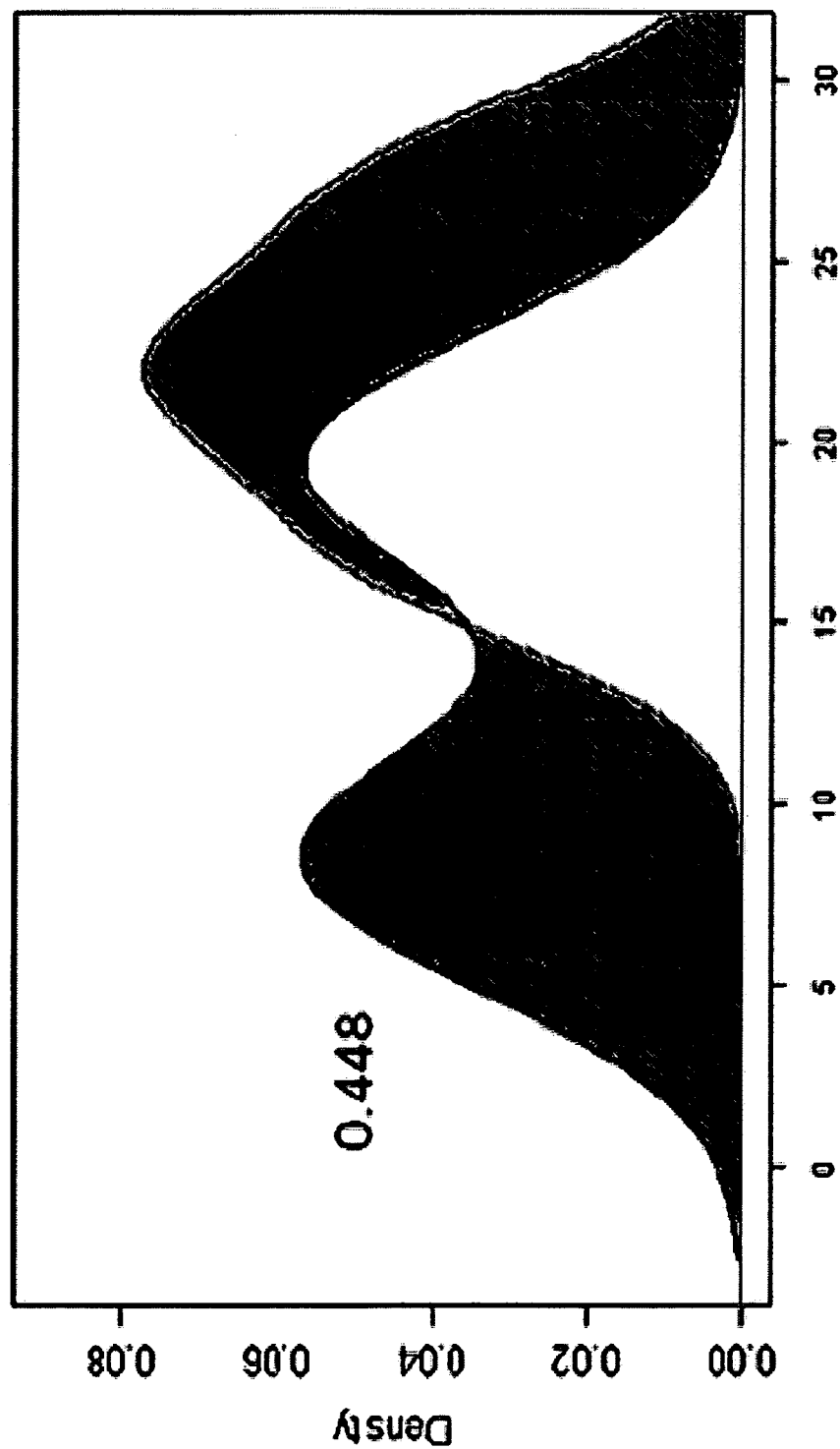
FIG. 19 is a depiction of a pair of probability density functions in partially overlapping relation in accordance with one aspect of the present invention.

The influence component can also consider differences in directionality between each of the established signatures and the control signature. As shown in FIG. 19, the directionality of the difference is determined by the directed divergence. This directionality determines whether events are closer or farther than expected statistically, which translates into the variable classifications. Once determined, the relative weights for each variable can be incorporated as variable coefficients in subsequent calculations by the function component, and in cases where a variable appears to have no determinative effect, the variable can be assigned a coefficient of zero.

As further shown in FIG. 12, an alert component 96 can also be provided which incorporates assessments from the event likelihood component 25 in order to determine and notify individuals or units in the field of operation (area of interest) about potential hot spots. Such a notification may include a notice to evacuate the area, or a notice to take certain action in or around the area.

As shown in FIG. 13A, in one embodiment of the invention, the event likelihood component 25 is accessible via a network 100 such as the Internet through one or more user input components 101-106. For example, input component 101 can provide a user interface for entering the training data used by the event likelihood component in generating assessments. Layer selection component 102 can be provided with a user interface to allow a user to select which layers and relevant variables of interest the user wishes to employ in the analysis. Different layers of the same variable might be selected based on time frame, for example. Alternatively, different variables might be selected within the same layer. A user might also choose to assign weights to the variables manually, or designate the integration of the influence component of FIG. 12. Area of interest and/or layer update component 103 can be provided to input new or updated areas of interest and/or layers into the system. Reverse lookup component 104 can be provided with a user interface to allow a user to enter information pertaining to an unknown event type, so as to have the system of the invention determine which event type most closely matches the signature corresponding to the input data. The reverse lookup component determines the type of event associated with the event data by determining an event data signature, comparing the event data signature with known signatures, and determining what the most likely event is. Alert units 105 can also be provided in communication with network 100 to receive alert notifications as described in connection with FIG. 12.

Figure 20:
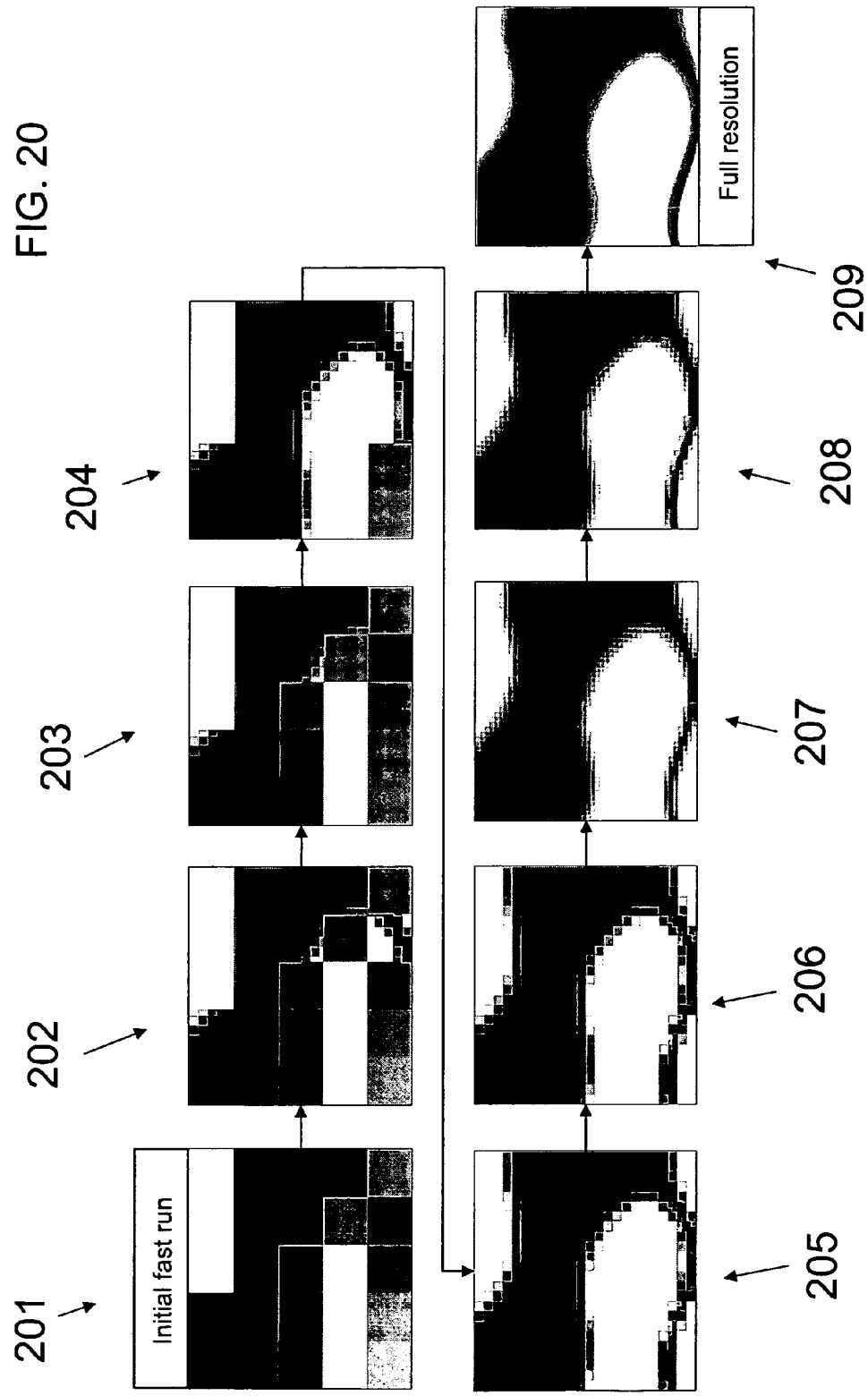
FIG. 20 shows a series of images of varying resolution in accordance with a further aspect of the present invention.

As shown in FIG. 20, for time sensitive assessments, the invention can produce a low resolution product (e.g., 201) and then use the information from that assessment to triage the remaining processing to complete the highest resolution image (e.g., 209). This can occur over multiple stages of refinement as a background process (e.g., 202-208). As a user requests a result, they receive the most updated assessment if the final assessment has not been completed.

While not shown, a result likelihood component can be provided in lieu of or in addition to the event likelihood component, with the difference being that the result likelihood component is concerned with past results, and not necessarily past events. For example, the result likelihood component can collect result information, such as the location of the top performing retail store in a retail chain, and use the system of the present invention to determine a likelihood of a similar result occurring in a different location.

In one embodiment, the invention can also provide information as to why an event was predicted for a given geospatial area. For example, if a given cell appears to have the highest score, designating the closest signature match, one can drill down into the details of why a given cell or region has the highest score. For example, a user might employ a graphical user interface to select a segment of the display. The invention will then reveal a list of all features used in the assessment sorted according to their contribution to the grid element selected. The top ten features are then reported to the user.

In a further embodiment, the invention also contemplates that a given map may have "hot" and "cold" cells that vary depending on time of day, time/day of week, time/day of month, or time/day/season of year. It will be appreciated that the invention can use flat maps and maps adjusted for the earth's curvature. It will also be appreciated that the invention allows portability of analysis, as preprocessed data and event information can be stored in a binary file and used in laptops, PDAs, cell phones or other mobile computing devices in the field.

It will be appreciated that various problems presented by governments, private companies and individuals require specific novel solutions for use with the present invention. For example, a company involved in landscaping may desire a list of targeted prospects. Such a company would not be interested in townhomes having no land for trees, shrubs, flowers and the like. Thus, such a company would use the present invention with certain static variables of interest programmed in, such as land utilization (e.g., homes with yards, new building construction areas) and other similar variables. A general portal access component 106, as shown in FIG. 13A, can provide an interface for a user who may enter general problem specifications, allowing the event likelihood component 25 to determine which area of interest, layers, variables, weighting and other factors to incorporate in providing an assessment.

Another company type, such as a retail establishment, would likely be more concerned with past successful results of other similar establishments (whether its own establishments or those of others) and not necessarily past events. Such an approach using the present invention might assess locations of existing establishments having gross revenues in excess of a target number, and the invention might determine proximity of such establishments to major and minor roads, stoplights, other complementary retailers (e.g., a shoe store near a dress shop, or an ice cream store near a strip mall), etc. With such information, the invention would then determine a probability density function or other appropriate function (e.g., a signature) and compare cells of a geographic grid to determine the location with the highest likelihood of reproducing the results of the pre-existing retail establishments. In such an embodiment, the present invention could map the results from a first geographic grid to a second grid, such as a developing community, for example.

For law enforcement and similar applications, users of the present invention might be more interested with events than results. Also, in such applications, users might desire to employ specific delivery mechanisms (e.g., binary files delivered by wireless communication) for real-time information collection and dissemination. In such applications, the present invention might also use more dynamic variables, such as vehicle density during given hours of given days of the week. Such information might be helpful in determining potential get-away routes for would-be criminals, for example.

The present invention can adapt to real-time communication of events in presenting geospatial analysis and event prediction. For example, the present invention may provide different "hot spot" analysis for a series of events that occur every few days, as opposed to a batch of events that occurred weeks earlier, followed by another batch of events occurring in current time. In the latter scenario, greater weight can be placed on the "live" events in predicting where the next similar event might occur.

In one embodiment of the present invention, input events can be weighted in any manner desired. In this way, as an example, if more recent events are believed to have a higher forecasting impact on future similar events, recent events can be weighted more times for the resulting assessment. Other factors, such as the lethality of an attack, or actual revenues, for example, can be considered as factors or events which receive greater weight. It will be appreciated that placing greater weight on a given input event would not require the present invention to make the same function call and/or determination multiple times. Rather, the function call could be made once, and then the results weighted numerically in order to reduce the memory and computational drag on the system.

In one embodiment of the invention, a web-based portal can be provided to allow users to define a problem for which geospatial modeling is desired. The business features (e.g., payment, contractual, privacy), programming and connectivity features (e.g., Internet programming available by high or low-speed connection through web and application servers), and security features (e.g., firewall, SSL) of such an arrangement will be appreciated as well-known in the art.

The geospatial modeling method and system of the present invention has an extensive array of applications. Service and product-based businesses can learn where to target market, to whom to market, where to locate an establishment, what markets to expand into, what variables are more reliable predictors of success, and so forth.

EXAMPLE 1

The following example is provided as an illustrative case of the operation of the present invention.

User A is a metropolitan crime analyst who develops planning maps for the tasking of law enforcement units. Due to a recent increase in breaking and entering offenses, User A desires to create a summary map that will describe the likelihood of a breaking and entering event occurring throughout her city.

Figure 14:
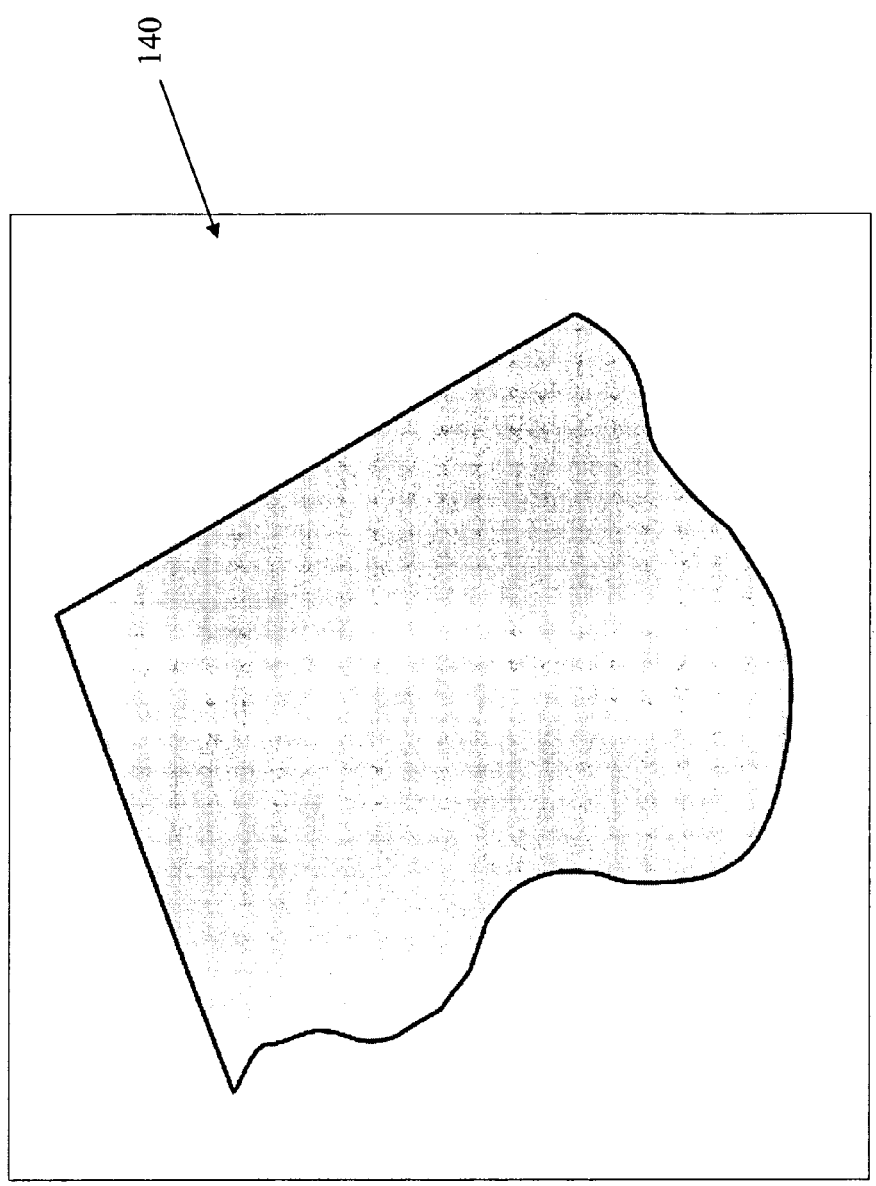
Figure 15:
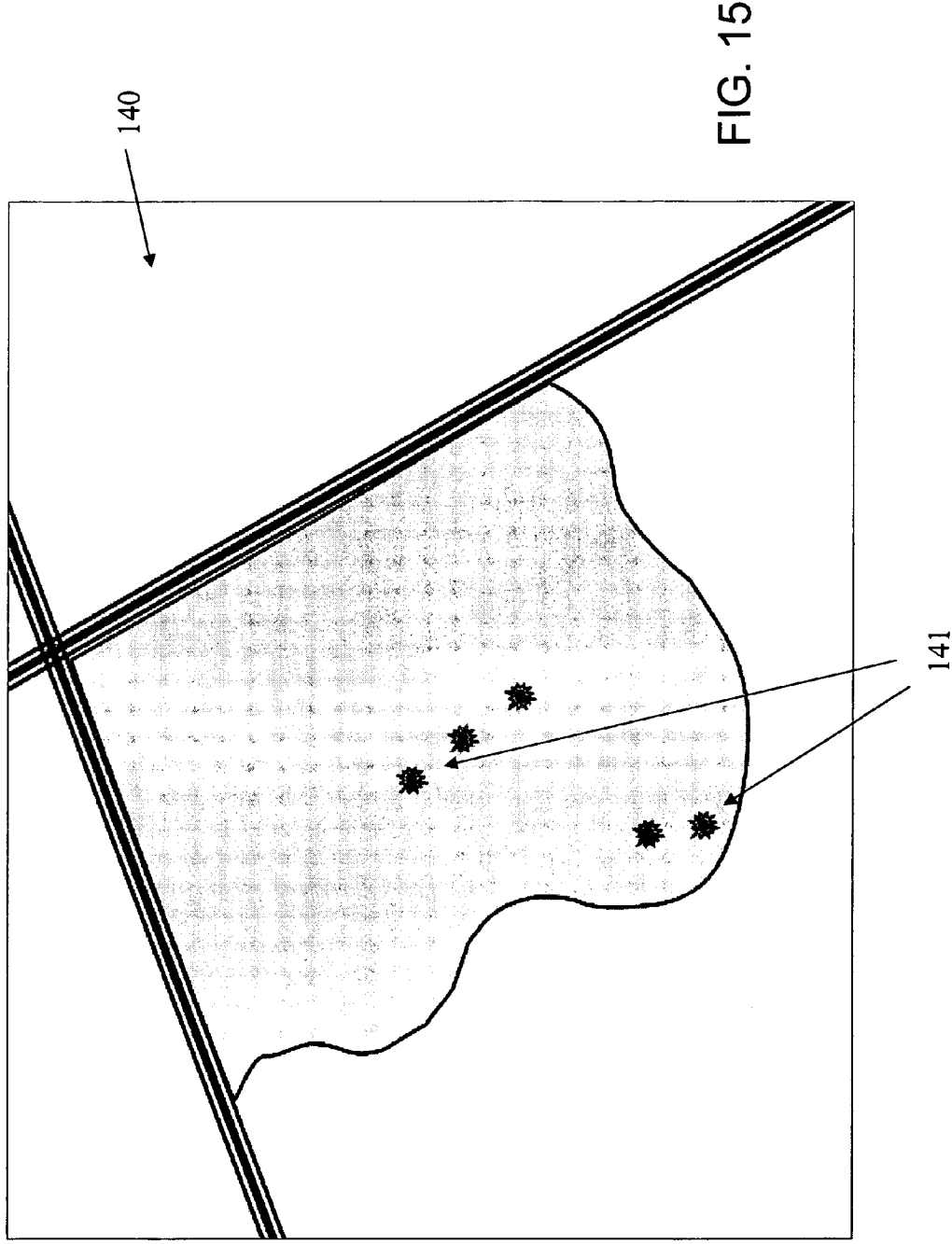
Figure 16:
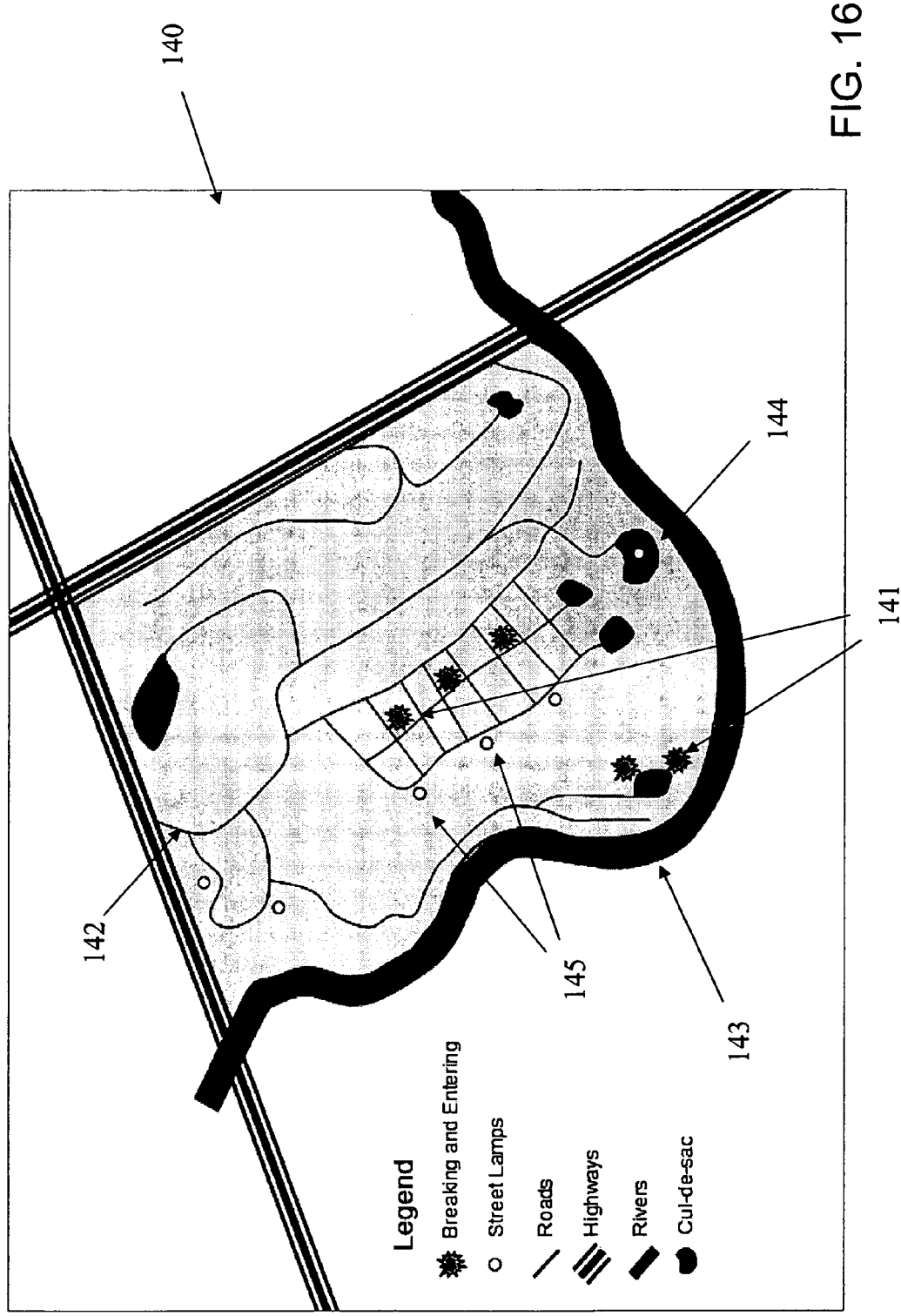

FIG. 14 is an example geographical depiction of an area of interest 140 within User A's city, available through the boundary component of the present invention. As noted by elements 141 in FIG. 15, User A can apply training data from the previous month's breaking and entering offenses onto the area of interest, using training data input component 30. As shown in FIG. 16, User A can then import relevant base layer data from her city as available through layer component. The layers included are "roads" 142, "rivers" 143, "cul-de-sacs" 144, and "street lamps" 145.

Figure 17:
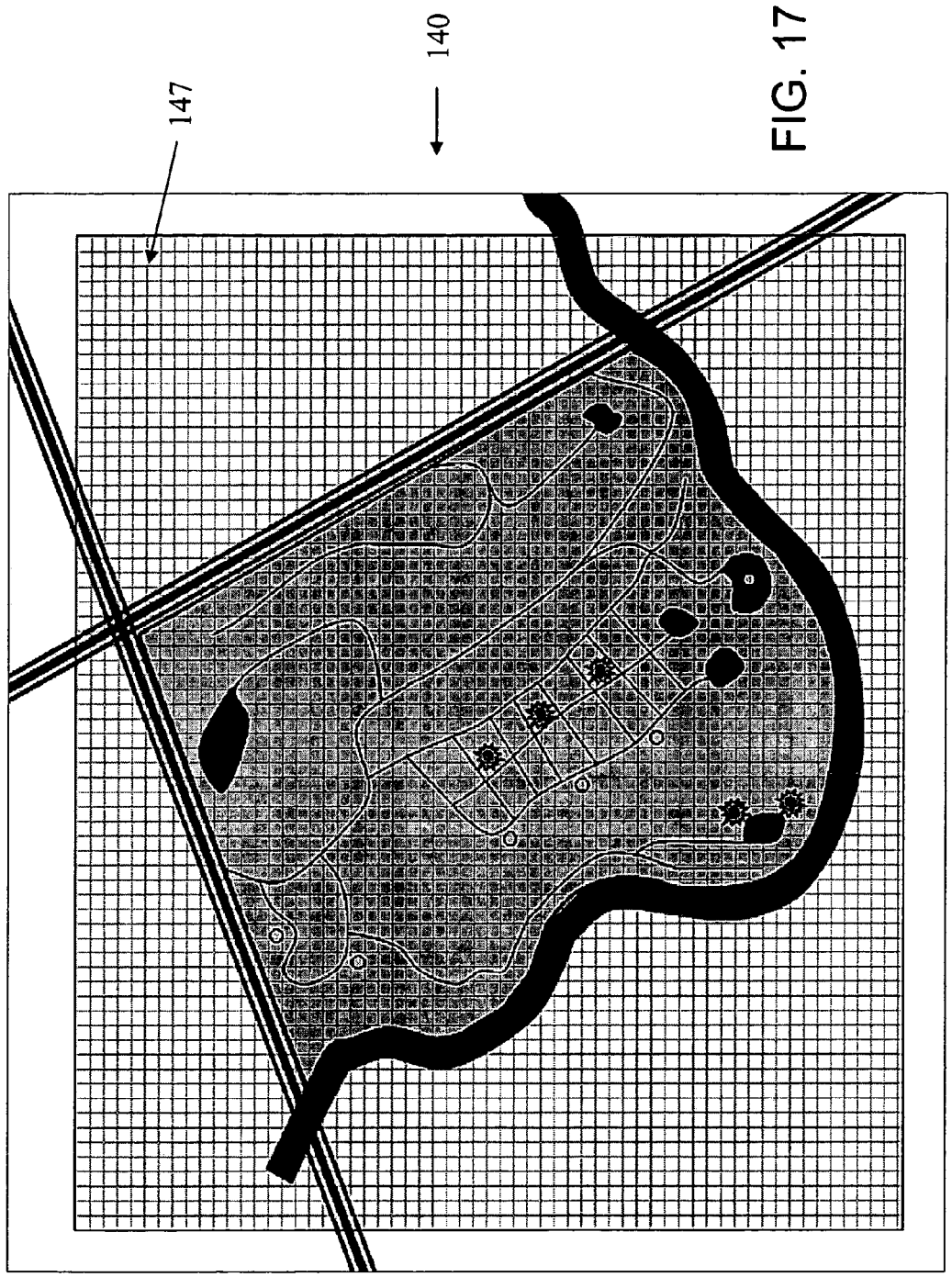

User A can then use the boundary component of the invention to create a uniform grid 147 over the city or area of interest 140, as shown in FIG. 17. Next, User A uses the signature derivation component of the present invention to create a signature of breaking and entering events. In one embodiment, this signature is selected to be a collection of probability density functions for the distances to the nearest of each of the features.

For an event i, an estimate of the density at i for the distance to roads is given by:

$$\hat{f}_i = \sum_{j=1}^{n} \frac{1}{n\sqrt{2\pi\sigma^2}} \exp\left\{\frac{-(dist \text{ from event } j \text{ to nearest road})^2}{2\sigma^2}\right\}$$

Where j denotes the $j^{th}$ event training point where $j=\{1 \ldots n\}$

User A next uses the event likelihood component of the present invention to link the signature of breaking and entering with the regular grid. In one embodiment, the regular grid has been previously analyzed using the function component of the present invention, such that values or functional measurements associated with each cell of the grid have been identified and indexed. For example, a nearest neighbor distance measurement from each cell's center point to the variable of interest (or a feature within the variable of interest, e.g.) will have been determined and stored via the function component. The linking of the derived signature with the regular grid can be performed, in one embodiment, by calculating the distance from each event from the training data to the nearest feature element, and assessing the likelihood score associated with that distance for each feature. In one embodiment, a weighted average of these scores is taken to find the combined score across all features.

Figure 18:
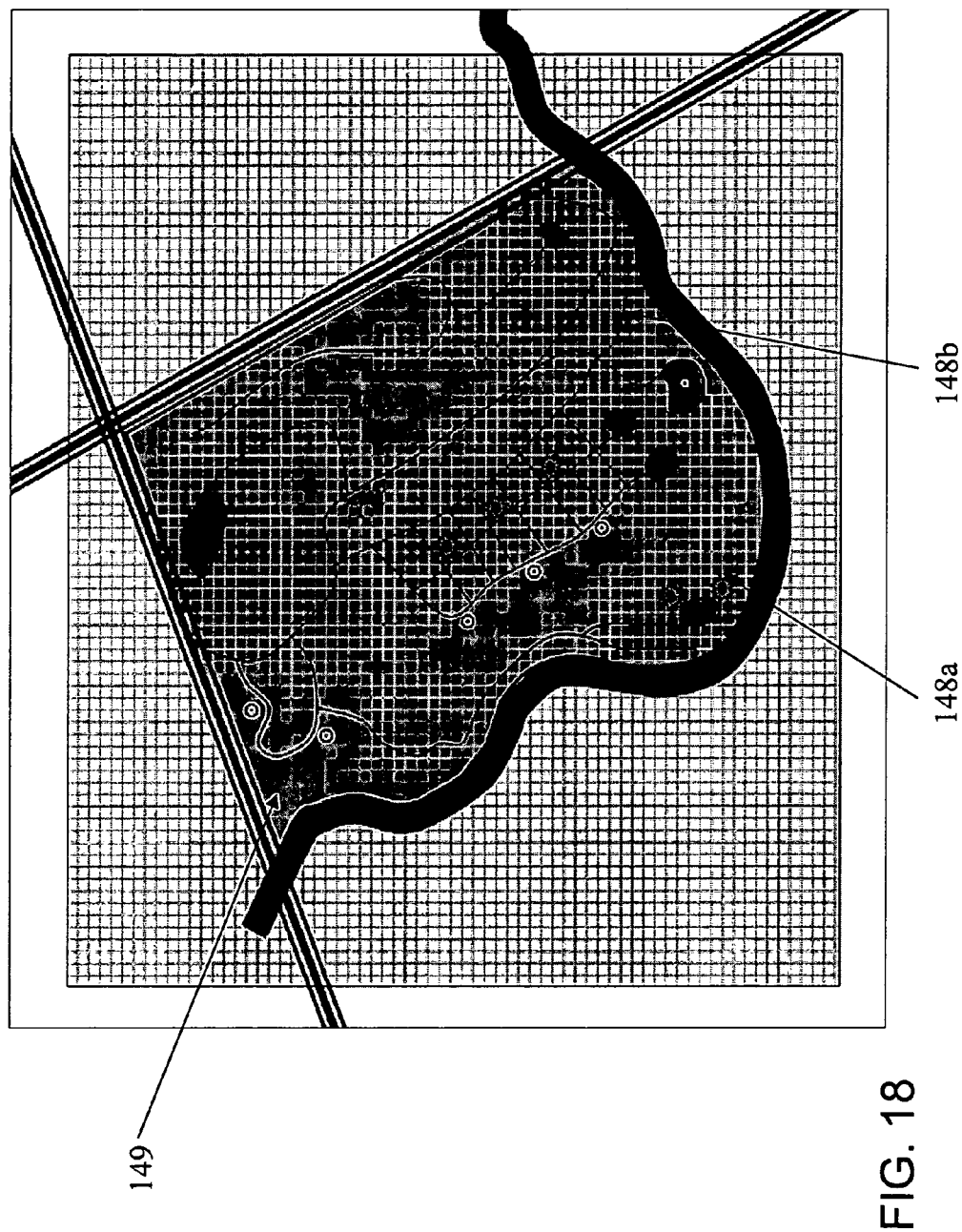

As shown in FIG. 18, User A can then use the assessment element of the invention to shade the resulting assessment according to the likelihood score. In one embodiment, areas of deeper shading such as 148a and 148b, for example, can be used to denote a greater likelihood of such an event occurring in or around that location in the future. On the other hand, areas of lighter or no shading such as 149 can indicate areas where the event is determined to be less likely to occur.

EXAMPLE 2

The following example is provided as an additional illustrative case of the operation of the present invention.

User B is a planning district manager deciding on the best location for a new municipal fire station. There are twenty-two possible neighborhoods in the city where a fire station could be located. User B would like to recommend a location that will place the new fire station in the area most likely to have fire incidents causing a significant amount of damage based on observed data for the previous year. The travel time for an emergency vehicle to the fire location is the primary measure of distance for this task. Data for city locations is stored in a parcel map outlining each identified parcel in the community; these parcels will be used as the output grid for the analysis.

Figure 21:
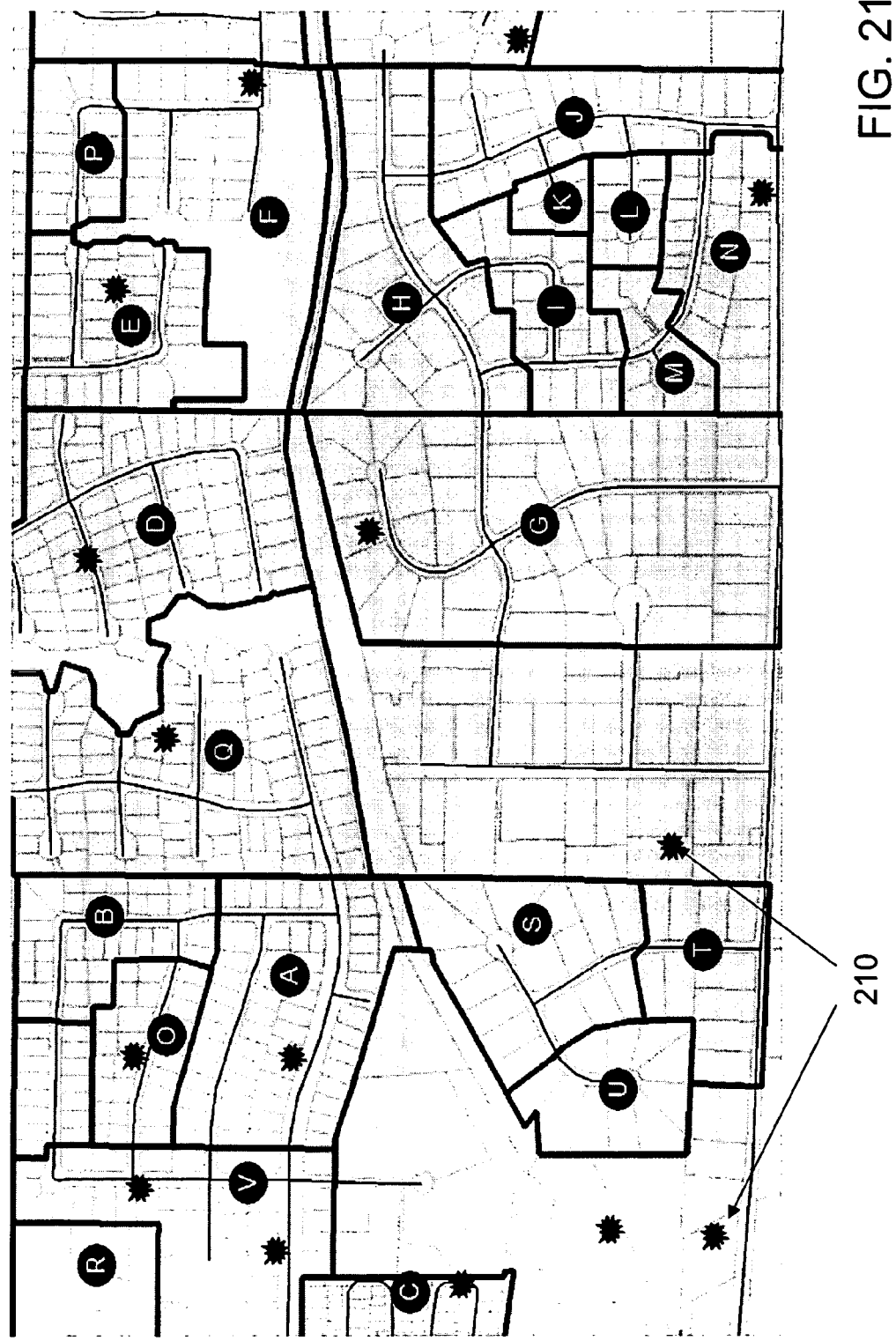
FIGS. 21 through 23 and 25 are graphical depictions of geographical areas of interest as described in connection with an example implementation of the present invention.
Figure 22:
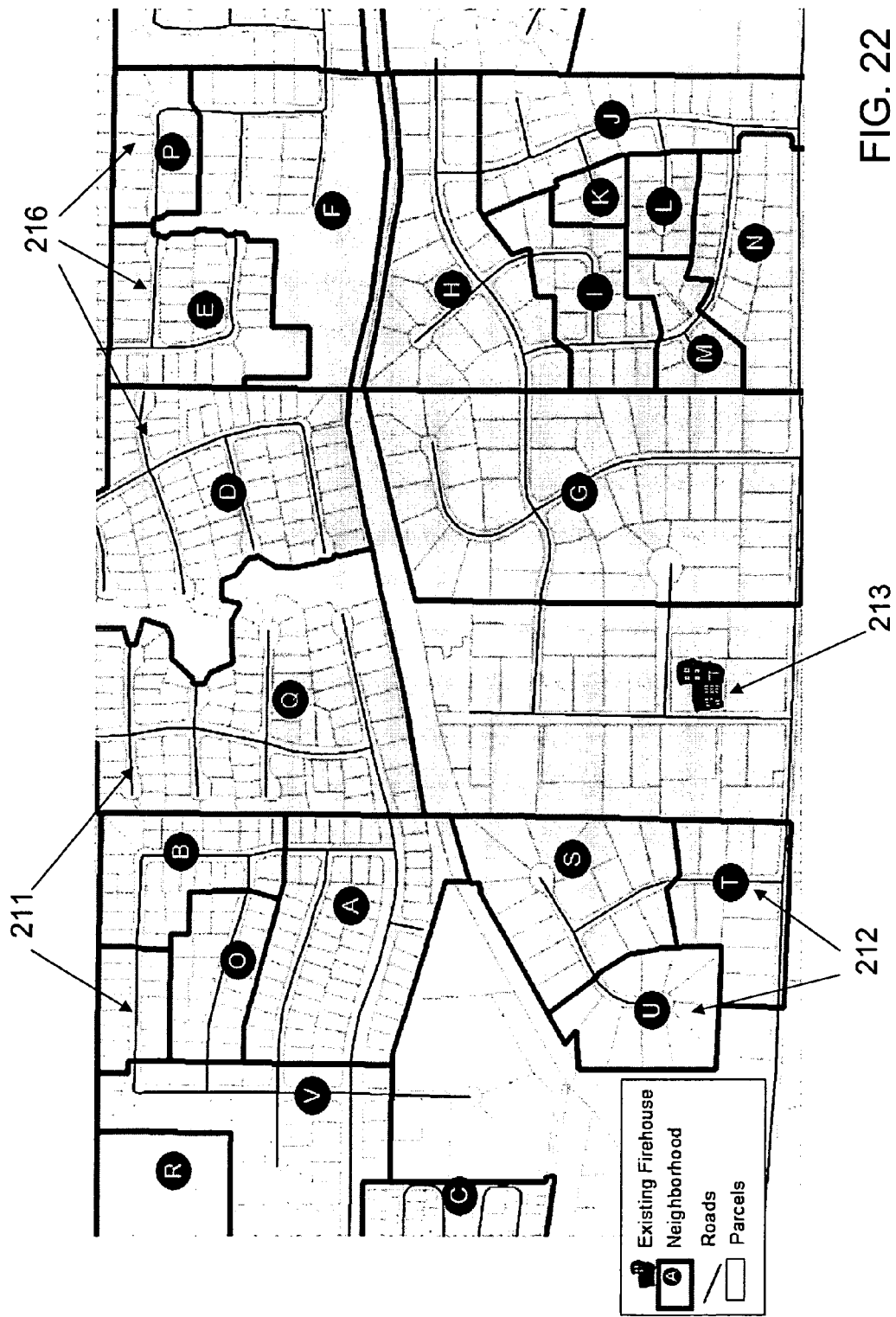

As shown in FIG. 21, User B applies training data 210 from the previous year's house fire incidents. In this example, User B uses the invention to import relevant base layer data from her city. The layers can include, for example "roads" 211, "neighborhoods" 212, "current fire station 213", "housing construction type", and "housing values", as shown in FIG. 22.

Figure 23:
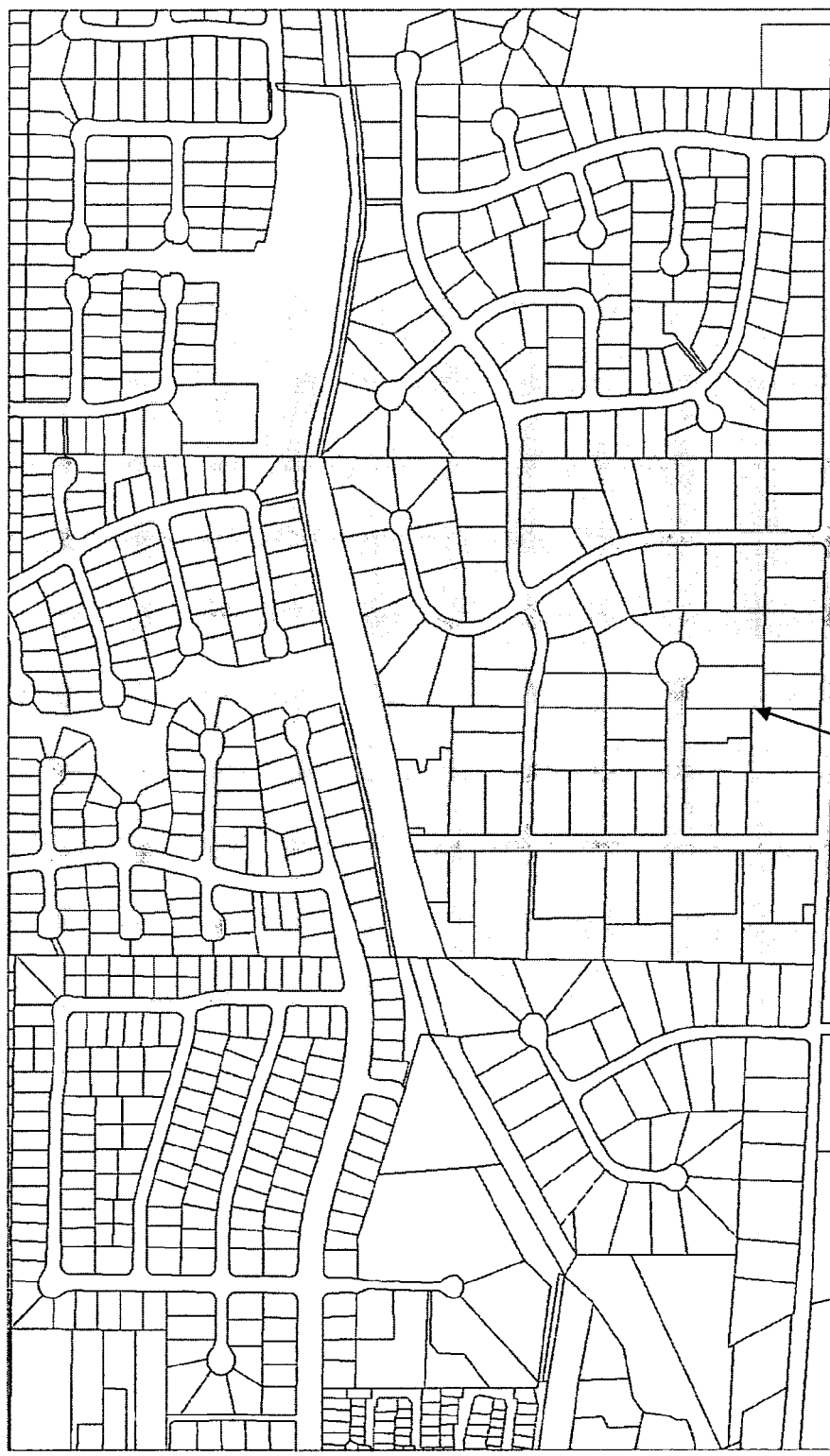

User B uses the invention to select the city parcel layer 215 as the output layer, as shown in FIG. 23. This layer 215 is an irregular grid of shapes 216 (see FIGS. 21 and 22) that define the boundaries of taxable property units. They are useful because they contain construction and value data on the structures that are built on those parcels.

User B can then use the invention to create a signature of residential fire events. This signature is selected to be a collection of probability density functions for the distances to the nearest of each of the features. As an example, the housing construction variable may contain the following proportions:

| Stone: | 0.20 |
| Brick: | 0.20 |
| Wood: | 0.60 |

Figure 24A:
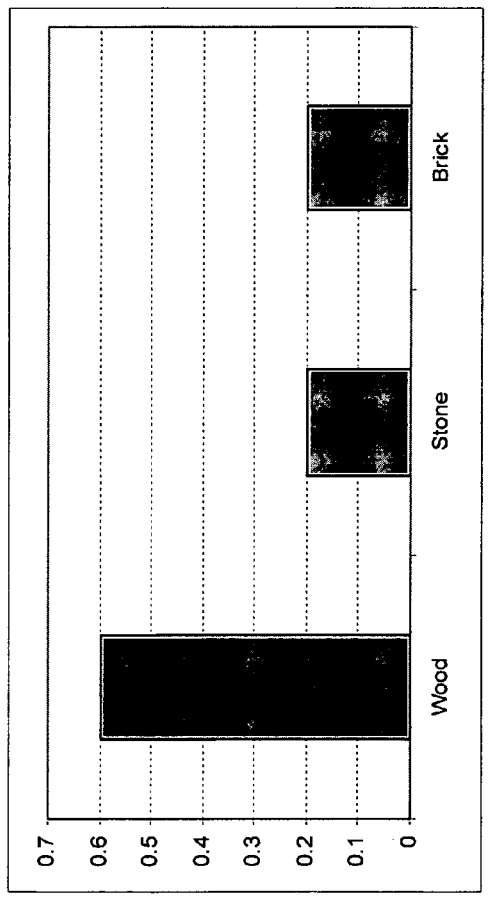
FIG. 24A is an example histogram and FIG. 24B is an example probability density function in accordance with an example implementation of the present invention.
Figure 24B:
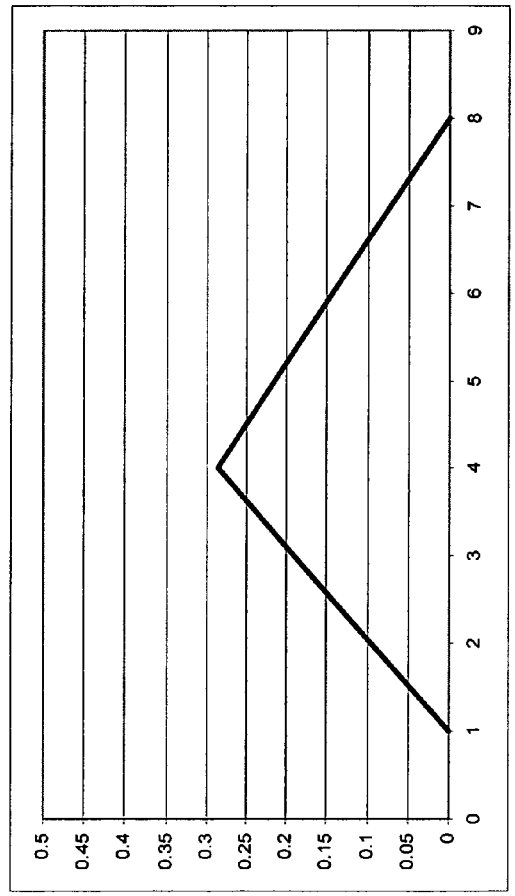
Figure 25:
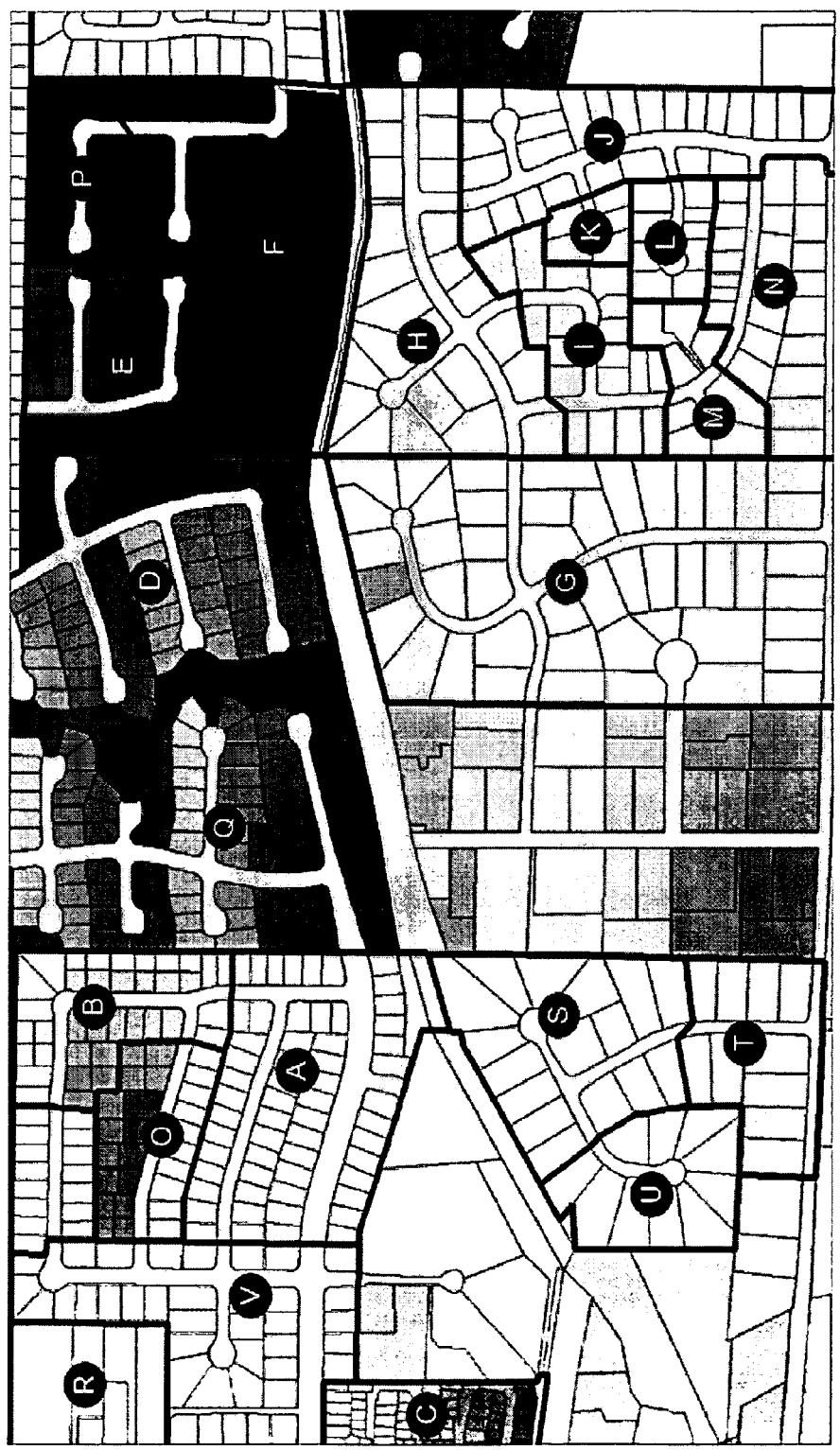

User B next uses the histogram tool of the present invention to create a manual density function for construction type. FIG. 24A shows a histogram 220 and FIG. 24B shows a triangular distribution (i.e., with min, max, mode). User B then uses the invention to link the signature of high damage house fires with the irregular grid. This linkage is performed by calculating the travel distance along the road network from each parcel grid cell to the nearest feature element and finding the likelihood score associated with that distance for each feature. In one embodiment of the invention as described above, a weighted average of these scores can be taken to find the combined score across all features. User B then uses the invention to shade the resulting assessment according to the likelihood score, as shown in the diagram 225 of FIG. 25. Upon receiving the final assessment, User B can see that neighborhood P is the best location to place the firehouse based on the high vulnerability of houses in that area. User B can also send an alert message using the invention to the fire personnel who operate in that neighborhood. It will be appreciated that alert notifications can also be employed in real-time emergency situations.

It will be apparent to one skilled in the art that any computer system that includes suitable programming means for operating in accordance with the disclosed methods also falls well within the scope of the present invention. Suitable programming means include any means for directing a computer system to execute the steps of the system and method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system. The present invention can further run on a variety of platforms, including Microsoft Windows™, Linux™, Sun Solaris™, HP/UX™, IBM AIX™ and Java compliant platforms, for example.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

What is claimed and desired to be secured by Letters Patent is:

1. A geospatial event forecasting engine for forecasting the likelihood for occurrence of at least one event type, comprising:

a spatial database storing geospatial boundary information for one or more areas of interest, and further storing geospatial characteristic information pertaining to at least one variable of interest in the form of one or more variable layers associated with said one or more areas of interest, with the variable of interest being unrelated to past event type data for the at least one event type;

a boundary component for establishing a geospatial boundary pertaining to a first area of interest and a grid containing a plurality of cells within said boundary;

a function component for identifying a first functional measurement of a cell element for each cell to said at least one variable of interest for each of said one or more layers associated with said first area of interest, and for indexing said first functional measurement for each cell, thereby establishing a database of first functional measurements unrelated to the event type;

a signature derivation component for receiving geospatial information related to one or more past events of at least one event type, including location information for said one or more past events, said signature derivation component further identifying and indexing an event functional measurement from the location information for each of said one or more events to the at least one variable of interest for each of said layers, and deriving a signature pattern for said event type based upon the event functional measurement; and an event likelihood determinant component for determining a level of signature match between said derived signature pattern and at least one cell of said plurality of cells, whereby a forecast of an event-type likelihood can be displayed on at least a portion of a display of said geospatial boundary based on said determined level of signature match.

2. The engine of claim 1 wherein said functional measurement is not a nearest neighbor value and is one from the group of measurements including: density, concentration, average distance by actual path, Manhattan distance, visibility.

3. The engine of claim 2 wherein said functional measurement is average distance by actual path, wherein said actual path is artificial.

4. The engine of claim 2 wherein said functional measurement is average distance by actual path, wherein said actual path is a natural path.

5. The engine of claim 1 wherein said functional measurement is a manual function.

6. The engine of claim 1 wherein said at least one variable of interest is non-static.

7. The engine of claim 1 wherein said event likelihood determinant component determines whether there is a signature match by determining a score indicative of said at least one cell's compatibility with the event type signature.

8. The engine of claim 7 wherein said event likelihood determinant component determines whether there is a signature match for each of said cells within said boundary and further plots said scores on a choropleth graph.

9. The engine of claim 1 wherein said at least one variable of interest is provided with a plurality of feature types individually indexed by a respective feature identifier.

10. The engine of claim 1 wherein said plurality of cells are of irregular shape.

11. The engine of claim 10 wherein said cell irregular shapes are determined by political boundaries.

12. The engine of claim 10 wherein said cell irregular shapes are determined by natural boundaries.

13. The engine of claim 10 wherein said cell irregular shapes are not determined by political or natural boundaries.

14. The engine of claim 1 wherein said signature derivation component represents said received geospatial information in a non-point format.

15. The engine of claim 14 wherein said non-point format is one of the formats from the group consisting of: polygon, line, three-dimensional.

16. The engine of claim 1 wherein said event likelihood determination component determines, for each event, the individual cell element nearest said event and associates the functional measurement for said nearest individual cell element with said event.

17. The engine of claim 1 wherein said event likelihood determination component determines said level of signature match between said derived signature pattern and at least one cell of said plurality of cells through comparison with said indexed functional measurement.

18. The engine of claim 1 wherein said event likelihood determination component determines said level of signature match between said derived signature pattern and each of said plurality of cells.

19. The engine of claim 1 wherein said established boundary is a first boundary, and wherein said engine further includes a signature transfer component for applying said derived signature to indexed functional measurements of a second boundary, said second boundary having a plurality of cells therein, and determining a level of signature match between said derived signature and at least one cell of said plurality of cells in said second boundary.

20. The engine of claim 19 wherein said indexed functional measurements of said second boundary are measured from a cell element for each cell in said second boundary to at least one variable of interest, the at least one variable of interest within said first boundary being different from the at least one variable of interest within said second boundary.

21. The engine of claim 1 wherein said functional measurement is not a probability density function.

22. The engine of claim 1 further including a layer selection component for selecting at least one of said plurality of layers for imposing upon said grid.

23. The engine of claim 1 wherein said one or more variable layers are each indicative of one or more variables of interest which are different from the one or more variables of interest of the remaining layers.

24. The engine of claim 1 wherein said one or more variable layers are indicative of the same variable or variables of interest, but wherein each of said layers represents a time frame which is different from the remaining layers.

25. The engine of claim 1 wherein said cell element is a centroid.

26. The engine of claim 1 wherein at least one of said cells includes a plurality of cell elements and wherein said function component identifies and indexes a functional measurement for each cell element for each cell to said at least one variable of interest for each of said layers.

27. The engine of claim 1 further including an alert component for communicating said signature match determination to at least one remote agent operating within said geospatial boundary.

28. A method of forecasting geospatial events of at least one event type, comprising the steps of:

storing geospatial boundary information for one or more areas of interest;

storing geospatial characteristic information pertaining to at least one variable of interest in the form of one or more variable layers associated with said one or more areas of interest, with the variable of interest being unrelated to fast event type data for the at least one event type;

establishing a geospatial boundary pertaining to a first area of interest and a grid containing a plurality of cells within said boundary;

identifying a first functional measurement of a cell element for each cell to said at least one variable of interest for each of said one or more layers associated with said first area of interest, and indexing said first functional measurement for each cell thereby establishing a database of first functional measurements unrelated to the event type;

receiving geospatial information related to one or more past events of at least one event type, including location information for said one or more past events;

identifying and indexing an event functional measurement from the location information for each of said one or more events to the at least one variable of interest for each of said layers, and deriving a signature pattern for said event type based upon the event functional measurement; and determining a level of signature match between said derived signature pattern and at least one cell of said plurality of cells, whereby a forecast of an event type likelihood can be displayed on at least a portion of a display of said geospatial boundary based on said determined level of signature match.

29. The method of claim 28 wherein said functional measurement is not a nearest neighbor value and is one from the group of measurements including: density, concentration, average distance by actual path, Manhattan distance, visibility.

30. The method of claim 28 wherein said functional measurement is a manual function.

31. The method of claim 28 wherein said step of determining a level of signature match determines a score indicative of said at least one cell's compatibility with the event type signature.

32. The method of claim 31 wherein said step of determining a level of signature match determines whether there is a signature match for each of said cells within said boundary and further plots said scores on a choropleth graph.

33. The method of claim 28 wherein said at least one variable of interest is provided with a plurality of feature types individually indexed by a respective feature identifier.

34. The method of claim 28 wherein said plurality of cells are of irregular shape.

35. The method of claim 34 wherein said cell irregular shapes are determined by political boundaries.

36. The method of claim 34 wherein said cell irregular shapes are determined by natural boundaries.

37. The method of claim 34 wherein said cell irregular shapes are not determined by political or natural boundaries.

38. The method of claim 28 wherein said received geospatial information is represented in a non-point format.

39. The method of claim 38 wherein said non-point format is one of the formats from the group consisting of: polygon, line, three-dimensional.

40. The method of claim 28 wherein said step of determining a level of signature match determines, for each event, the individual cell element nearest said event and associates the functional measurement for said nearest individual cell element with said event.

41. The method of claim 28 wherein said step of determining a level of signature match determines said level of signature match between said derived signature pattern and at least one cell of said plurality of cells through comparison with said indexed functional measurement.

42. The method of claim 28 wherein said step of determining a level of signature match determines said level of signature match between said derived signature pattern and each of said plurality of cells.

43. The method of claim 28 wherein said established boundary is a first boundary, and wherein said method further includes the steps of applying said derived signature to indexed functional measurements of a second boundary, said second boundary having a plurality of cells therein, and determining a level of signature match between said derived signature and at least one cell of said plurality of cells in said second boundary.

44. The method of claim 43 wherein said indexed functional measurements of said second boundary are measured from a cell element for each cell in said second boundary to at least one variable of interest, the at least one variable of interest within said first boundary being different from the at least one variable of interest within said second boundary.

45. The method of claim 28 wherein said functional measurement is not a probability density function.

46. The method of claim 28 further including a layer selection component for selecting at least one of said plurality of layers for imposing upon said grid.

47. The method of claim 28 wherein said one or more variable layers are each indicative of one or more variables of interest which are different from the one or more variables of interest of the remaining layers.

48. The method of claim 28 wherein said one or more variable layers are indicative of the same variable or variables of interest, but wherein each of said layers represents a time frame which is different from the remaining layers.

49. The method of claim 28 wherein at least one of said cells includes a plurality of cell elements and wherein said function component identifies and indexes a functional measurement for each cell element for each cell to said at least one variable of interest for each of said layers.

50. The method of claim 28 further including the step of providing an alert component for communicating said signature match determination to at least one remote agent operating within said geospatial boundary.

51. A method for determining an event type based on an event signature, comprising the steps of:
establishing a geospatial boundary and a grid containing a plurality of cells within said boundary;
establishing at least one layer imposed upon the grid, the layer being indicative of geospatial characteristics of at least one variable of interest, with the variable of interest being unrelated to past event type data for the event signature;
identifying a first functional measurement of a cell element for each cell to the variable of interest, and for indexing said first functional measurement for each cell;
receiving geospatial information pertaining to one or more post events of a given event type, including location information for said one or more past event;
identifying an event functional measurement to the at least the variable of interest for each of said events;
determining a likelihood associating said event type's relative proximity to the variable of interest;
establishing a signature for said event type based on said determined likelihood;
receiving an outside event signature associated with said boundary;
determining a level of signature match between said established signature and said outside event signature.

52. A decision support system, comprising:
means for establishing a group of options associated with a system decision;
means for associating each option of said group of options with an area of interest (AOI);
means for collecting training data associated with each of said options;
means for establishing a result forecast for each option; and
means for scoring said result forecasts so as to determine which option in said group of options is optimal.

53. The system of claim 52 wherein said means for establishing a result forecast for each option comprises:
a boundary component for establishing a geospatial boundary associated with said AOI and a grid containing a plurality of cells within said boundary;
a layer component for establishing at least one layer imposed upon the grid, the layer being indicative of geospatial characteristics of at least one variable of interest, with the variable of interest being unrelated to the training data;
a function component for identifying a first functional measurement of a cell element for each cell to said at least one variable of interest, and for indexing said first functional measurement for each cell;

a signature derivation component for receiving geospatial information related to one or more past events of at least one event type, including location information for said one or more past events, said signature derivation component further identifying and indexing an event functional measurement from the location information for each of said one or more events to the at least one variable of interest, and deriving a signature pattern for said event type based upon the event functional measurement;

an event likelihood determinant component for determining a level of signature match between said derived signature pattern and at least one cell of said plurality of cells.

54. The system of claim 52 wherein said group of options is a group of potential retail establishment locations.

55. The system of claim 52 wherein said group of options is a group of potential insurance candidates.

56. A decision support system for learning from at least one past meaningful result comprising:

means for establishing at least one geospatial area of interest (AOI) comprising a two-dimensional, cell-based, geospatial boundary;

means for imposing at least one layer of geospatial information on said AOI, said geospatial information including at least one variable of interest, with the variable of interest being unrelated to the past meaningful result;

means for determining the proximity of each cell in said boundary to each of said at least one variable of interest;

means for determining a location of the past meaningful result;

means for determining the proximity of the past meaningful result to said at least one variable of interest;

means for establishing a signature associated with said result; and means for determining a closest match with said result signature among said cells.

57. A system for forecasting an event of a given event type, comprising:

an interface for receiving a problem definition;

a forecasting component having a plurality of areas of interest, a plurality of variable layers, each variable layer being associated with a respective variable of interest that is unrelated to past event type data for the given event type, and a plurality of training data elements representing at least one discrete event;

a selection interface for receiving a selection of at least one area of interest and at least one variable layer, a training data interface for receiving a selection of training data;

an assessment component for applying said training data to said selected area of interest and said selected variable layer to determine a forecast for one or ore locations within said area of interest where a future event related to said at least one discrete event may occur.

58. The system of claim 57 wherein said training data selection is made by said user.

59. The system of claim 58 wherein said training data selection is made by said system according to said problem definition.

* * * * *

UNITED STATES PATENT AND TRADEMARK OFFICE
CERTIFICATE OF CORRECTION

PATENT NO. : 7,346,597 B2 Page 1 of 1
APPLICATION NO. : 11/098510
DATED : March 18, 2008
INVENTOR(S) : Mark E. Dumas and Jason R. Dalton It is certified that error appears in the above-identified patent and that said Letters Patent is hereby corrected as shown below:

Title Page, Item (75) "Inventor:", please include --Jason R. Dalton, Vienna, VA (US)-- as a co-inventor in the above patent.

Signed and Sealed this

Twenty-fifth Day of November, 2008

JON W. DUDAS
*Director of the United States Patent and Trademark Office*